US011586603B1

(12) United States Patent
Rozenfeld et al.

(10) Patent No.: US 11,586,603 B1
(45) Date of Patent: Feb. 21, 2023

(54) INDEX SHEETS FOR ROBUST SPREADSHEET-BASED APPLICATIONS

(71) Applicant: Amazon Technologies, Inc., Seattle, WA (US)

(72) Inventors: Joseph Rozenfeld, San Carlos, CA (US); Stephen Brodsky, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

(21) Appl. No.: 15/987,841

(22) Filed: May 23, 2018

(51) Int. Cl.
 *G06F 16/22* (2019.01)
 *G06F 40/18* (2020.01)

(52) U.S. Cl.
 CPC ...... *G06F 16/2264* (2019.01); *G06F 16/2272* (2019.01); *G06F 40/18* (2020.01)

(58) Field of Classification Search
 None
 See application file for complete search history.

(56) References Cited

U.S. PATENT DOCUMENTS

| | | |
|---|---|---|
| 5,187,788 A | 2/1993 | Marmelstein |
| 5,255,356 A | 10/1993 | Michelman et al. |
| 5,255,363 A | 10/1993 | Seyler |
| 5,371,675 A | 12/1994 | Greif et al. |
| 5,396,587 A | 3/1995 | Reed |
| 5,481,692 A | 1/1996 | Ryu et al. |
| 5,499,371 A | 3/1996 | Henninger et al. |
| 5,504,848 A | 4/1996 | Yamada |
| 5,553,215 A | 9/1996 | Kaethler |
| 5,603,021 A | 2/1997 | Spencer et al. |
| 5,604,854 A | 2/1997 | Glassey |
| 5,708,827 A | 1/1998 | Kaneko et al. |
| 5,893,123 A | 4/1999 | Tuinenga |
| 6,157,934 A | 12/2000 | Khan et al. |
| 6,269,473 B1 | 7/2001 | Freed et al. |
| 6,490,600 B1 | 12/2002 | McGarry |
| 6,601,234 B1 | 7/2003 | Bowman-Amuah |
| 6,631,497 B1 | 10/2003 | Jamshidi et al. |
| 6,691,281 B1 | 2/2004 | Sorge |
| 6,742,175 B1 | 5/2004 | Brassard |
| 6,877,155 B1 | 4/2005 | Lindsey |
| 6,901,579 B1 | 5/2005 | Suguta |

(Continued)

OTHER PUBLICATIONS

Google, "IMPORTRANGE—Docs editors Help," downloaded from https://support.google.com/docs/answer/3093340 on Oct. 4, 2017, pp. 1-3.

(Continued)

*Primary Examiner* — Irene Baker
(74) *Attorney, Agent, or Firm* — Robert C. Kowert; Kowert, Hood, Munyon, Rankin & Goetzel, P.C.

(57) ABSTRACT

At a data management service, an index structure corresponding to a data sheet is stored. The data sheet comprises a grid of cells. An entry of the index structure comprises a reference to content of a cell of the data sheet. In response to a grid structure change of the data sheet, the index entry is automatically updated such that the same content remains referenced from the index entry as before. A result of a computation of an application is obtained using an identifier of the index entry to obtain content from the data sheet. The result is provided to a destination.

20 Claims, 13 Drawing Sheets

(56) References Cited

U.S. PATENT DOCUMENTS

| | | | |
|---|---|---|---|
| 6,988,241 B1 | 1/2006 | Guttman et al. | |
| 7,032,210 B2 | 4/2006 | Alloing et al. | |
| 7,047,518 B2 | 5/2006 | Little et al. | |
| 7,069,499 B1 | 6/2006 | McGarry | |
| 7,225,189 B1 | 5/2007 | McCormack et al. | |
| 7,404,176 B2 | 7/2008 | Reeder et al. | |
| 7,404,177 B1 | 7/2008 | Greenfield et al. | |
| 7,941,438 B2 | 5/2011 | Molina-Moreno et al. | |
| 8,146,000 B1 | 3/2012 | Boliek et al. | |
| 8,327,351 B2 | 12/2012 | Paladino et al. | |
| 8,407,668 B2 | 3/2013 | Lindhorst | |
| 8,812,625 B1 | 8/2014 | Chitilian et al. | |
| 8,938,726 B1 | 1/2015 | Barak | |
| 9,053,083 B2 | 6/2015 | Waldman et al. | |
| 9,710,429 B1 | 7/2017 | Raghunath | |
| 9,734,139 B2 | 8/2017 | Reeves et al. | |
| 9,798,889 B1* | 10/2017 | Karpel | G06F 40/18 |
| 10,073,844 B1 | 9/2018 | Grzech et al. | |
| 10,191,897 B1 | 1/2019 | Olkin | |
| 10,705,805 B1 | 7/2020 | Boswarth et al. | |
| 10,740,550 B1 | 8/2020 | Bosworth et al. | |
| 10,846,469 B2 | 11/2020 | Sobhy Deraz | |
| 10,877,735 B1 | 12/2020 | Buck et al. | |
| 11,063,925 B1 | 7/2021 | Vera et al. | |
| 11,086,894 B1* | 8/2021 | Srivastava | G06F 16/904 |
| 11,397,565 B2 | 7/2022 | Buck et al. | |
| 2002/0065846 A1 | 5/2002 | Ogawa et al. | |
| 2002/0091990 A1 | 7/2002 | Little et al. | |
| 2002/0133368 A1 | 9/2002 | Strutt et al. | |
| 2003/0106040 A1 | 6/2003 | Rubin et al. | |
| 2003/0110191 A1 | 6/2003 | Handsaker et al. | |
| 2003/0110472 A1 | 6/2003 | Alloing et al. | |
| 2004/0015368 A1 | 1/2004 | Potter et al. | |
| 2004/0233232 A1 | 11/2004 | Iborra et al. | |
| 2005/0044496 A1 | 2/2005 | Kotler et al. | |
| 2005/0081141 A1 | 4/2005 | Jonsson | |
| 2005/0257196 A1 | 11/2005 | Hollander et al. | |
| 2006/0015805 A1* | 1/2006 | Humenansky | G06Q 10/0631 715/209 |
| 2006/0041543 A1 | 2/2006 | Achlioptas | |
| 2006/0069696 A1 | 3/2006 | Becker et al. | |
| 2006/0136534 A1 | 6/2006 | Boon | |
| 2006/0149740 A1 | 7/2006 | Tsutazawa et al. | |
| 2006/0200748 A1 | 9/2006 | Shenfield | |
| 2006/0224946 A1 | 10/2006 | Barrett et al. | |
| 2007/0016650 A1 | 1/2007 | Gilbert et al. | |
| 2007/0130511 A1 | 6/2007 | Roberge et al. | |
| 2007/0136666 A1 | 6/2007 | Khen et al. | |
| 2008/0005658 A1 | 1/2008 | Benhase et al. | |
| 2008/0162532 A1 | 7/2008 | Daga | |
| 2008/0270561 A1 | 10/2008 | Tang et al. | |
| 2008/0270980 A1 | 10/2008 | Ahadian et al. | |
| 2008/0275910 A1 | 11/2008 | Molina-Moreno et al. | |
| 2009/0006842 A1 | 1/2009 | Ross et al. | |
| 2009/0006939 A1* | 1/2009 | DeSpain | G06F 40/18 715/217 |
| 2009/0037873 A1 | 2/2009 | Ahadian et al. | |
| 2009/0044091 A1 | 2/2009 | Gur | |
| 2009/0070412 A1 | 3/2009 | D'Angelo et al. | |
| 2009/0313245 A1 | 12/2009 | Weyl et al. | |
| 2010/0169759 A1 | 7/2010 | Le Brazidec et al. | |
| 2010/0250497 A1 | 9/2010 | Redlich et al. | |
| 2011/0087954 A1 | 4/2011 | Dickerman et al. | |
| 2011/0113424 A1 | 5/2011 | Ewington et al. | |
| 2011/0209133 A1 | 8/2011 | Mahajan et al. | |
| 2012/0110001 A1 | 5/2012 | Young | |
| 2012/0265758 A1 | 10/2012 | Han et al. | |
| 2013/0013993 A1* | 1/2013 | Oh | G06F 30/20 715/212 |
| 2013/0055058 A1 | 2/2013 | Leong | |
| 2013/0080887 A1 | 3/2013 | Hou | |
| 2013/0117651 A1 | 5/2013 | Waldman et al. | |
| 2013/0290822 A1 | 10/2013 | Chen | |
| 2014/0136936 A1 | 5/2014 | Patel et al. | |
| 2014/0157098 A1 | 6/2014 | Maresca | |
| 2014/0164895 A1* | 6/2014 | Matheson | G06F 40/18 715/212 |
| 2015/0040104 A1 | 2/2015 | Mall et al. | |
| 2015/0089344 A1 | 3/2015 | Pickering et al. | |
| 2015/0142740 A1 | 5/2015 | Behuria et al. | |
| 2015/0169532 A1 | 6/2015 | Otero et al. | |
| 2016/0041963 A1* | 2/2016 | Coblenz | G06F 40/177 715/227 |
| 2016/0055139 A1* | 2/2016 | Creason | G06F 40/18 715/217 |
| 2016/0142488 A1 | 5/2016 | Adler et al. | |
| 2016/0342582 A1 | 11/2016 | Hiatt | |
| 2017/0032279 A1 | 2/2017 | Miserendino et al. | |
| 2017/0098008 A1 | 4/2017 | Kemmer | |
| 2017/0177621 A1 | 6/2017 | Cardonha et al. | |
| 2017/0178002 A1 | 6/2017 | Moriarty et al. | |
| 2017/0255596 A1 | 9/2017 | Rochelle et al. | |
| 2017/0331915 A1 | 11/2017 | Jann et al. | |
| 2017/0337233 A1 | 11/2017 | Fawcett et al. | |
| 2018/0014076 A1 | 1/2018 | Shanson et al. | |
| 2018/0014077 A1 | 1/2018 | Hou et al. | |
| 2018/0025161 A1 | 1/2018 | Gauthier et al. | |
| 2018/0068666 A1 | 3/2018 | Riedmiller et al. | |
| 2018/0107671 A1 | 4/2018 | Plenos et al. | |
| 2018/0157467 A1 | 6/2018 | Stachura | |
| 2018/0157468 A1* | 6/2018 | Stachura | G06F 8/38 |
| 2018/0181378 A1 | 6/2018 | Bakman | |
| 2018/0242038 A1 | 8/2018 | Harper et al. | |
| 2018/0260373 A1 | 9/2018 | Sobhy Deraz | |
| 2018/0349134 A1 | 12/2018 | Studer et al. | |
| 2019/0012308 A1 | 1/2019 | Dvorak | |
| 2019/0250891 A1 | 8/2019 | Kumar et al. | |
| 2019/0370322 A1 | 12/2019 | Miller, III | |
| 2020/0092351 A1 | 3/2020 | Chiussi et al. | |
| 2020/0334019 A1 | 10/2020 | Bosworth et al. | |
| 2020/0364400 A1 | 11/2020 | Bosworth et al. | |
| 2021/0019472 A1 | 1/2021 | Dickerman et al. | |

OTHER PUBLICATIONS

Microsoft, "Overview of Excel tables," downloaded from https://support.office.com/en-us/article/Overview-of-Excel-tables-7ab0bb7d-3a9e-4b56-a3c9-6c94334e492c on Oct. 2, 2017, pp. 1-6.

Microsoft, "Work with hyperlinks in Excel," downloaded from https://support.office.com/en-us/article/Work-with-hyperlinks-in-Excel-7fc80d8d-68f9-482f-ab01-584c44d72b3e on Oct. 3, 2017, pp. 1-9.

Lili Mou, et al., "On End-to-End Program Generation from User Intention by Deep Neural Networks," ACM, Oct. 25, 2015, pp. 1-4.

Tao Lei, et al., "From Natural Language Specifications to Program Input Parsers," 2013, In Association for Computational Linguistics (ACL), pp. 1-10.

Joel Galenson, et al., "CodeHint: Dynamic and Interactive Synthesis of Code Snippets," ICSE'14, May 31-Jun. 7, 2014, ACM 978-1-4503-2756-5/14/05, pp. 653-663.

Amazon web Services, "Amazon Machine Learning, Developer Guide, Version Latest," Copyright © 2017 Amazon Web Services, Inc., pp. 1-153, downloaded Feb. 2, 2017.

"17 Top App Makers to Create Your Own Mobile App—Without a Single Line of Code!," May 16, 2017, downloaded from https://www.websitetooltester.com/en/blog/app-makers/, pp. 1-48.

Mehdi Manshadi, et al., "Integrating Programming by Example and Natural Language Programming," Copyright c 2013, Association for the Advancement of Artificial Intelligence (www.aaai.org), pp. 1-7.

U.S. Appl. No. 15/839,663, filed Dec. 12, 2017, Adam Bosworth, et al.

U.S. Appl. No. 15/818,667, filed Nov. 20, 2017, Adam Bosworth, et al.

Travis C. Service et al., "Anytime dynamic programming for coalition structure generation", Extended Abstract, 2010, pp. 1411-1412.

Jiang He, et al., "Adaptive User Interface Generation for Web Services", IEEE International Conference on e-Business Engineering, Aug. 14, 2020, pp. 536-539.

(56) References Cited

OTHER PUBLICATIONS

KP Gummadi, et al., "Measurement, modeling, and analysis of a peer-to-peer file-sharing workload", Published on 2003, SOSP'03, Oct. 19-22, 2003, Bolton Landing, New York, USA, Copyright 2003 ACM, pp. 314-329.
JA Sanchez, et al., "AGS: Introducing agents as services provided by digital libraries", Published on 1997, DL 97 Philadelphia PA, USA , Copyright 1997 ACM, pp. 75-82.
A Machiry, "Dynodroid: An input generation system for android apps", ESEC/FSE 2013: Proceedings of the 2013 9th Joint Meeting on Foundations of Software Engineering, published on 2013, pp. 224-234.
Jan S. Rellermeyer, et al., "R-OSGi: Distributed Application through Software Modularization", Springer, Published on 2001,pp. 1-20.
U.S. Appl. No. 16/913,310, filed Jul. 2, 2020, Adam Bosworth, et al.
Sestoft, P., "Implementing Function Spreadsheets," 2008, ACM, pp. 91-94.
U.S. Appl. No. 15/714,466, filed Sep. 25, 2017, Rebecca Buck et al.
U.S. Appl. No. 16/367,092, filed Mar. 27, 2019, Joseph Rozenfeld, et al.

* cited by examiner

US 11,586,603 B1

INDEX SHEETS FOR ROBUST SPREADSHEET-BASED APPLICATIONS

BACKGROUND

As collecting and storing data from a variety of sources has become easier and cheaper in recent years, business decisions are increasingly being made in a data driven manner. Over recent decades fairly sophisticated data processing applications have been developed using databases of various types, including traditional relational databases, object-oriented databases, non-relational or "NoSQL" databases, and the like. In some cases, such data processing applications have been designed to handle millions of even billions of data records.

Typically, developing and changing applications that rely on database systems is a non-trivial exercise, usually involving teams of programmers and long development cycles. Large well-financed organizations may be able to hire enough programming staff to develop and maintain the applications for various target environments, or outsource the work of developing and maintaining the applications. However, for a "long tail" of relatively small teams or individuals, the costs associated with developing full-fledged data management applications using conventional database systems may sometimes be prohibitive. Furthermore, interacting with the database applications may sometimes require expertise in languages (such as various versions of the Structured Query Language in the case of relational databases) in which expertise may sometimes be lacking in small teams.

In contrast to large and complex database systems, spreadsheets offer an easier-to-use approach towards managing data. Spreadsheets offer a tabular view of data, often with fewer restrictions (for example on the types of data that can be stored in a given row or column) than database systems, and allow many common types of calculations to be performed on data sets using formulas that are relatively easy to understand and modify. However, especially as the size and complexity of the data sets to be managed increases, applications that access data stored in spreadsheets may tend to fail or break down if and when certain types of structural changes are made to the underlying spreadsheets.

Figure 1:
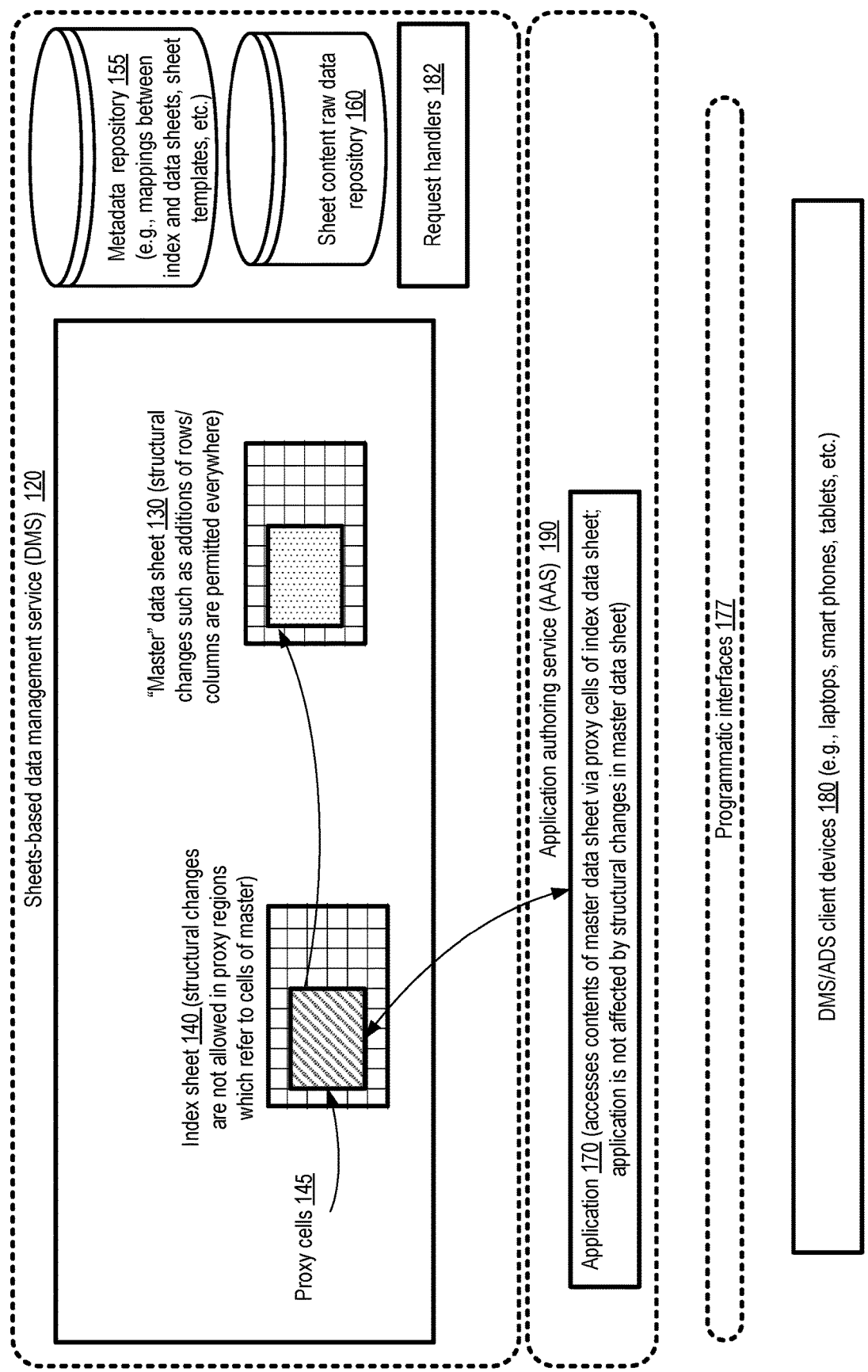
FIG. 1 illustrates an example system environment in which a data management service, in which index sheets may be created as intermediaries between applications and data, may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for enhancing the robustness of data sheets-based applications using intermediary index sheets are described. In some embodiments, the index sheets may be implemented to help support a rich data model (which may be referred to as a "web-of-sheets" data model) for data elements presented to users in the form of logically linkable two-dimensional cell grids or data sheets. In effect, in at least some embodiments, the index sheets may be used to insulate applications from various types of structural changes that may be applied to the underlying data sheets, such as additions/insertions of rows/columns, which may otherwise potentially cause references from the applications to point to the wrong portions of the underlying data sheets. Such structural changes at the data sheets may tend to occur more frequently, for example, in scenarios in which the data sheets are accessible and modifiable by a number of users, although the structural changes may also be made in single-user scenarios in various embodiments. If index sheets were not used, the applications may potentially have to be painstakingly updated in order to avoid errors or incorrect computations when such structural changes occur to the underlying data sheets. Index sheets may also enhance data security substantially in various embodiments. For example, application developers may be permitted to access and/or modify index sheets (e.g., in their respective sandboxes) in some embodiments, but may not be permitted to perform operations that modify the underlying referenced data stored in the data sheets. As a result of the indirection introduced using index sheets, the integrity and safety of the application data may be ensured in such embodiments, As one skilled in the art will appreciate in light of this disclosure, certain embodiments may be capable of achieving various technical advantages, including some or all of the following: the total amount of computation, memory, and/or networking resources (as well as time and engineering effort) that may be required to implement and deploy the applications may be decreased substantially as a result of utilizing index sheets, application data security may be enhanced, the number of failures or faults in sheets-based applications may be reduced, computational resources and time required for debugging sheets-based applications may be reduced, and/or the time needed to transfer knowledge regarding a sheets-based application (as when a new application author is brought into a team) may be reduced.

According to some embodiments, a system may comprise one or more computing devices of a network-accessible data management service. The computing devices may include instructions that upon execution on a processor cause the one or more computing devices to obtain, via a programmatic interface, an indication that at least a portion of contents of a first data sheet is to be accessed (e.g., indirectly, without referring to the first data sheet itself) by an application, where the first data sheet comprises a first grid of cells. The computing devices may generate and store a first index sheet, comprising a second grid of cells in various embodiments. A particular cell of the first index sheet may comprise a reference to a first content element (e.g., a data value or a formula) of a first cell of the first data sheet. Such reference-containing cells may be referred to as "proxy" cells in at least some embodiments. In response to a grid structure modification of the first data sheet which results in a change to a grid location of the first content element, the particular cell of the first index sheet may be automatically updated such that the first content element continues to be referenced from the particular cell in at least some embodiments. An application may utilize an identifier (e.g., grid coordinates) of the particular cell of the index sheet to access the first content element to perform one or more computations in various embodiments; the results of the computations may be provided to one or more destinations, such as a computing device being used by a client or user of the application, or a storage device indicated by such a user or client. In at least some embodiments in which the index sheet is used as an intermediary to access the data sheet, the application may continue to function correctly even if structural changes that change the grid coordinates of the referenced content of the underlying data sheet occur. In effect, in at least some embodiments a proxy cell may serve as a permanent pointer to the contents of a referenced cell, such that even if the referenced cell is moved around in its own data sheet (e.g., if/when new rows, columns or cells are added to the data sheet and cause a change to the grid location or coordinates of the referenced cell, or if/when some rows, columns or cells other than the referenced cell are deleted from the data sheet and the cell coordinates of the referenced cell are affected), the pointer remains pointing to the content for which it was originally designated as a pointer.

In at least one embodiment, one or more entities (such as application developers) may only be permitted to access and make certain types of modifications to index sheets, but may not be granted permission to modify at least some portions of the underlying data sheets referenced from the index sheets. The data sheets may, for example, comprise mission-critical business information which should not be modifiable by application developers. In effect, in such embodiments, some entities may be allowed to work within respective sandboxes comprising one or more index sheets usable to access the data sheets indirectly. Such sandboxes may be isolated, from a security perspective, from the data sheets themselves. If an entity permitted to access/modify an index sheet submits a request to modify the referenced data sheet itself, the request may be rejected in at least some embodiments. In one embodiment, some cells of a data sheet may be modifiable by entities that use index sheets to access other cells of the data sheet—that is, limited modification permissions with respect to data sheets may be granted to some users. In at least one embodiment, one or more entities may be granted permissions to access and modify any cells of data sheets as well as index sheets.

In various embodiments, at least some kinds of structural changes to the region(s) of the index sheet which contain the proxy cells may not be permitted. For example, if an attempt is made to insert a row, column or cell into the index sheet itself, such that the grid location or coordinates of a proxy cell would be modified as a result of the attempted insertion, the insertion may be rejected or aborted, and/or an error message may be generated. Similarly, deletions of one or more proxy cells may not be permitted in at least some embodiments, e.g., at least as long as the referenced cells of the data sheet remain. As such, in various embodiments, the references implemented with the help of the index data sheet may be referred to as "immutable" references. In one embodiment, a different approach towards ensuring application robustness with respect to changes made to index sheets may be used. In such an approach, instead of disallowing structural changes to the proxy cell portions of an index sheet, such changes may be permitted, but the application may be automatically updated to incorporate the changes to the index sheet. That is, a detection of a change to a grid location of a proxy cell of an index sheet may automatically trigger a modification of the application to incorporate the change of the grid location in such an embodiment, and a manual change to the application may not be required.

According to some embodiments, index sheets may be generated and/or stored at a data management service in response to one or more types of programmatic requests. The service may implement one or more programmatic interfaces in various embodiments, such as a set of application programming interfaces (APIs), a web-based console, command-line tools, graphical user interfaces and the like, which may be used by clients such as application developers to request the creation of index data sheets. In one embodiment, a client may, for example, select a portion of a displayed data sheet which contains cells whose content may be referenced from an application, and submit a command (e.g., using a drop-down menu or a hover-based menu) to create an index sheet for the selected portion. The selection of the portion of the data sheet may be performed in various embodiments using a mouse, stylus, finger, or other interface, which may result in highlighting of the selected portion in some cases. In some embodiments, the data management service may define a family of sheet types that can be created at the request of a user or client—e.g., a data sheet that is modifiable, a read-only data sheet, an index sheet, and the like. As such, an index sheet may represent a different base object class than other types of sheets in such embodiments (although its object class may inherit attributes from other types of sheets).

In at least one embodiment, by default, if there are a total of K cells of the data sheet whose contents are to be references from an index sheet, a total of K cells of the index sheet may be used for the immutable references to the data sheet. However, in some embodiments in which the data management service supports the creation of spreadsheet "tables" within data sheets, the amount of index information that has to be stored may be reduced relative to the total number of referenced cells. A spreadsheet table may comprise, for example, a region comprising M rows and N columns of related data of a data sheet for which a table name has been designated, and on which certain types of summarization/calculations (such as generating totals for various columns) and formatting (e.g., repeating alternating shading or banding of rows) operations are performed automatically by the data management service. In at least one embodiment, instead of using respective index sheet cells for each of the (M×N) cells of a table in a data sheet, the data management service may include only references to one row and one column of the table. Such a smaller number of references may suffice in various embodiments because only certain types of structural operations (such as additions of entire rows or entire columns) may be permitted on tables of the data sheet, and contents of the table after such modifications may be performed easily using the single-row, single-column entries of the index sheet. As such, the cardinality of the set of index sheet cells in which references to the table are stored may be reduced from (M×N) to no greater than (M+N) in at least some embodiments, thereby achieving potentially substantial savings with respect to the amount of memory and storage required for the index sheet. Similar space optimizations may also be implemented for non-contiguous groups of referenced cells in some embodiments (such as non-contiguous columns or non-contiguous rows) using cell range indicators in the index sheets as discussed below.

In various embodiments, the cells of an index sheet may be used in at least two ways by an application. The proxy cells of the index sheet may of course be used to refer to contents of data sheets as indicated above. However, in addition, in at least some embodiments, other cells of the index sheet which do not necessarily refer directly to contents of the data sheet may be used just like ordinary data sheet cells—e.g., they may be used to store values, expressions, formulas and the like, and may not be subject to restrictions regarding structural changes that may be imposed on the regions which contain proxy cells.

According to some embodiments, at least some applications that rely on index sheets and data sheets may be deployed to various platforms together with a local copy of a sheet recalculation ("recalc") engine, so that calculations using local versions of the sheets may be performed at the platforms themselves, e.g., without having to access resources of the data management service where the original versions of the sheets are stored. In one embodiment, respective independently-modifiable versions of a data sheet and the corresponding index sheet used by the application to access contents of the data sheet, may be stored at individual client-side application deployment platforms, such as smart phones, tablets, laptops and the like. Changes to the versions of the index sheets and/or the data sheets may be made asynchronously and/or independently with respect other versions in such embodiments, e.g., in response to input received via a programmatic interface (such as a touch screen, mouse, keyboard, stylus, etc.). In effect, independently-modifiable versions of the application and the underlying data and index sheets may be deployed in such embodiments, and the versions may evolve at least temporarily independently of each other—for example, a given user may create a customized or branched version of the application on their smart phone or laptop, and results computed using a local customized version of an index sheet may be provided to the user. In some embodiments, independently-modifiable copies of the index sheets, data sheets, and/or applications may be stored at, and accessed/modified by various entities using, edge devices of a provider network and/or at servers at a data center that is used to implement the sheets-based data management service itself. The specific locations at which the independently-modifiable versions are stored, and thus the mechanisms and programmatic interfaces that may be usable to access or modify the versions to create branched/customized versions of the application, may differ in various embodiments. In some cases the independently-modifiable versions of the index or data sheets may be stored at locations other than the applications that utilize them—e.g., the sheets versions may be stored at edge device or at the data centers of the provider network, and the branched applications themselves may be stored at client-side deployment platforms.

As mentioned earlier, in at least some embodiments index sheet functionality may be implemented as part of a web-of-sheets data model. Among other features, such a data model may, for example, support automatic instantiation of child data sheets based on templates or example data provided by users, as well as representation of invariant associations between proxy cells and groups of other cells (e.g., via index sheets as discussed above). Note that the use of proxy cells to represent invariant or immutable associations/references may not be limited to index sheets in at least some embodiments: e.g., one or more cells of a data sheet may be used as proxies to refer to other cells in the same data sheet or in other sheets. These and other features of the data model and its associated formula language may simplify several types of computations, such as computations involving automatic update propagations between sheets of a hierarchy or between cells linked by cell group associations. As the kinds of rich and easy-to-navigate relationships between groups of data elements that are enabled by the data model may be considered somewhat analogous to the kinds of relationships that may exist between documents or pages of the world wide web, the term "web-of-sheets" may be used to refer to the data model in various embodiments.

In at least some embodiments, one or more of the techniques described herein may be implemented at a network-accessible data management service, which in turn may be implemented at a provider network or cloud computing environment. A customer or client of such a service, such as a businessperson who may not necessarily be skilled in at least some aspects of database management but may be somewhat familiar with commonly-available spreadsheet programs, may utilize the service from several types of front-end programs running on a variety of client-side devices such as mobile phones, tablet computers, laptops, desktops and the like. The data entered into the cells of a given data sheet may be stored at one or more storage servers at a data center, and various techniques to support high levels of availability, durability and the like may be implemented transparently; that is, a user of the data management service may not necessarily be aware of the specific algorithms and devices used to store and protect the data. Individual users or groups of users of the data management service may set up shared workspaces in some embodiments, and workbooks comprising one or more data sheets may be created within a workspace at the request of a user. The term "user" and "client" may be used interchangeably with respect to embodiments in which the data model is supported at a network-accessible service.

In at least one embodiment, fairly complex relationships between various data elements or records may be established using the combination of hierarchical and cell proxy/association features similar to those described above. For example, a hierarchy may comprise thousands of data sheets, and immutable references or associations may potentially be created among large numbers of cells and cell groups. In some such embodiments, the data management service may provide a summary visualization of the relationships within a given workspace, e.g., indicating how many sheets there are at various levels of the hierarchy, the relationships that have been created for various groups of cells, and so on. Such a summary view may be provided, for example, in response to a programmatic query, and details of various parts of the web of sheets may be obtained in response to "zoom-in" requests and the like in some embodiments.

In addition to the core ability to easily model hierarchical relationships and permanent associations among cells, the web-of-sheets model may provide several additional practical benefits in various embodiments. Respective security or access sharing settings may be set up for the different sheets in a shared workspace, for example, enabling a cleaner separation of rights and responsibilities among the appropriate set of collaborating users/groups than if the users all had to share access to a single large data sheet. Locking of data at the cell level or row level, which may be inefficient and inconvenient for collaborating users, may not be required if the data is spread across a hierarchy or "network" of linked of sheets using the features of the web-of-sheets model.

The web-of-sheets model may also make it easier to parallelize at least some types of recalculation operations in at least some embodiments. Recalculation or "recalc" operations may be needed when, for example, the formulas for various cells of one or more sheets are defined in such a way that a change to a value in some set of cells triggers changes to the values in one or more other sets of cells. The dependency trees for some recalculation operations may be fairly complex. As a result of distributing the data of an application among a hierarchy of sheets and/or linked index and data sheets, it may become easier to perform some recalculations in parallel. Consider a scenario in which an application's data is distributed among a three-level hierarchy of sheets, L1, L2 and L3, such that some recalculation dependencies exist between the L3 and L2 levels and other recalculation dependencies exist between the L2 and L1 levels. Depending on the nature of the application, calculations involving dependencies among respective pairs of sheets at the L3 and L2 layers may be performed in parallel in such a scenario, and similarly, calculations involving dependencies among respective pairs of sheets at the L2 and L1 layers may be performed in parallel. As a result, the total time needed to perform a complex recalculation may be reduced.

In contrast to at least some spreadsheet applications, in which some data sheets may only be reached by clicking on tabs, the web-of-sheets model may enable a more intuitive navigation method (similar to navigation among pages of the world-wide web) for accessing logically related sets of cells in various embodiments. For example, in at least some embodiments, a user may navigate to a child sheet simply by clicking on a parent cell, and navigate back to the parent sheet if desired by clicking on a parent-proxy cell in the child sheet; clicking on tabs may not be required. Proxy cells may also be used to navigate among groups of cells which are not hierarchically related in various embodiments.

In at least some embodiments, as indicated earlier, a number of programmatic interfaces may be implemented by the data management service, such as one or more web-based consoles, application programming interfaces (APIs), command-line tools, and/or graphical user interfaces that can be used to manage and interact with the workspaces and their data sheets. In at least one embodiment, one or more APIs may enable the bulk uploading or transfer of data into data sheets, e.g., from a stream of incoming data records or from legacy data stores.

In various embodiments, in addition to the support for hierarchical or association relationships, the data management service may also support the use of standalone data sheets or workbooks with common spreadsheet-like capabilities such as charts, data analysis tools such as sorts/pivot tables, and the like. That is, the hierarchical and logical association capabilities offered by the service need not be used by some clients for whose applications baseline spreadsheet capabilities are sufficient. In various embodiments, standalone data sheets may be combined, within a given workspace, with automatically-generated sheet hierarchies and/or sheets containing immutable references to associated groups of cells.

Example System Environment

FIG. 1 illustrates an example system environment in which a data management service, in which index sheets may be created as intermediaries between applications and data, may be implemented, according to at least some embodiments. As shown, system 100 may comprise various resources and artifacts of a sheets-based data management service (DMS) 120 in the depicted embodiment. The DMS 120 may be used in conjunction with an application authoring service (AAS) 190 in some embodiments to develop and deploy applications that utilize a familiar and easy-to-use spreadsheet paradigm for managing data. In some embodiments, instead of being implemented as separate services, the DMS 120 may be implemented as part of the AAS 190, or the AAS 190 may be implemented as part of the DMS 120. In at least some embodiments, the DMS 120 and/or the AAS 190 may implement a set of programmatic interfaces 177, such as APIs, web-based consoles, command-line tools and/or graphical user interfaces. Such programmatic interfaces may be used by clients of the services to submit programmatic requests from various types of client devices 180 (e.g., laptops, desktops, phones, tablets and the like) to generate and store data sheets, index sheets, applications and associated metadata.

The creation, access and manipulation of a number of different categories or types of sheets, including data sheets and index sheets that can be used to refer to the data sheets, may be supported by the DMS 120 in the depicted embodiment. According to some embodiments, a client of the DMS may request, e.g., using programmatic interfaces 177, that some number of data sheets (such as a "master" data sheet 130) be created and stored on the client's behalf at the DMS.

In some embodiments, one or more data sheets, each comprising a respective two-dimensional grid of cells, may be created within a container or "workbook" of related sheets on behalf of one or more clients. Individual sheets may be accessed from within a workbook, for example, via tabs or similar interfaces in some embodiments. Individual cells of a data sheet may be used to store a variety of content element types in various embodiments, such as numerical, text or other literals, formulas or expressions referencing other cells of the same data sheet, other data sheets, and/or other types of sheets. In one embodiment, sharable workspaces may be created at the DMS, such that some number of clients may create, access and modify sheets within a given workspace.

According to one embodiment, a programmatic interface 177 may be employed to indicate to the DMS 120 that at least a portion of a data sheet 130 is to be accessed indirectly by an application 170. A data sheet 130 which is to be accessed by the application may be referred to as a "master" data sheet in some embodiments, e.g., to indicate that it is the authoritative store for at least some of the data being processed in the application. In one embodiment, a client may select, using a mouse or touch interface, a portion of a display of a data sheet 130 at a client device 180, and use a command (e.g., from a drop-down menu) to indicate that the selected cells are to be accessed indirectly from an application and may therefore require an index sheet. In response to the indication, the DMS 120 may generate and store an index sheet 140 corresponding to the master data sheet 130. In some embodiments in which a container such as a workbook is used to store one or more data sheets, an index sheet may be created within the same workbook. The index sheet may comprise a second grid of cells, and a particular cell of the index sheet (referred to as a proxy cell 145 in the depicted embodiment) may comprise a reference to a content element (e.g., a literal value or an expression) of a corresponding cell of the master data sheet 130 in the depicted embodiment. In response to a grid structure modification (e.g., an addition of a row, column or one or more cells) of the master data sheet 130, which results in a change to a grid location of the content element, the proxy cell 145 may be updated automatically in various embodiments, such that the content element continues to be referenced from the particular cell of the index sheet despite the grid structure modification. Note that, as is the case with contents of cells in general, the value of the content element itself may change in various embodiments—e.g., if the content element of a data sheet cell DSC1 for which a proxy cell PC1 has been created in an index sheet contains an expression that includes a reference to another cell DSC2, and the contents of the other cell DSC2 are updated, the value obtained via reference using PC1 may change accordingly.

The application 170, which may be authored or developed using resources and artifacts of the AAS 190 in the depicted embodiment, may refer to content of at least a part of the master data sheet 130 indirectly in the depicted embodiment, e.g., using an identifier (such as the grid coordinates) of the particular proxy cell 145 to access the content element of the master data sheet 130. The application may perform various computations on the data accessed indirectly via the intermediary index sheet 140, and provide results of the computations to one or more destinations in the depicted embodiment. In at least some embodiments, at least some types of structural changes to the region of the index sheet 140 which contains proxy cells 145 may be prohibited, e.g., to ensure that the indirect references used in the application 170 may continue to work. If, for example, a client attempts to add a row, column or cell within a proxy cell region, to delete a proxy cell, or delete other cells in the index sheet which could affect the coordinates of any proxy cell, in at least some embodiments the attempt may be rejected and/or an error message may be generated.

In some embodiments, a rich data model called a web-of-sheets model may be implemented at the DMS 120. In addition to the use of proxy cells as intermediaries to data sheets, the model may also support hierarchies of sheets—e.g., one or more child sheets may be created automatically based on a client-selected or client-specified template when data is added to a portion of a data sheet that is designated as comprising parent cells. In at least some embodiments, such hierarchies of sheets may also be implemented using index sheets, as discussed below in further detail. In some embodiments, the DMS 120 may include a metadata repository 155, in which for example mappings between index and data sheets may be stored, templates used for sheet hierarchies may be stored, and so on. The raw contents of data sheets (and/or index sheets) may be stored in a separate repository 160 in some embodiments. The DMS 120 may include a set of request handlers 182, implemented using one or more computing devices, which are responsible for fulfilling various types of sheet-related programmatic requests received via interfaces 177 in the depicted embodiment.

The amount of indexing-related metadata and/or data that has to be stored may vary based on the contents of the referenced data sheets in some embodiments. For example, in one embodiment, by default if there are K cells in a region of a master data sheet 130 that are potentially going to be referenced via an index sheet 140, K cells in the index sheet may be reserved or set aside as proxies. In contrast, in some embodiments, special named objects called "spreadsheet tables" may be supported within data sheets. A spreadsheet table may be generated, for example, to indicate that a sub-grid of M rows and N columns in a data sheet contains related data, and various types of computations and formatting operations may be performed using tabular semantics for the sub-grid—e.g., a row of totals for columns containing numeric quantities may be automatically generated, the cells of a table may be automatically formatted differently from cells that are not part of the table, the entire table may be resized as a unit using specialized user interface controls, and so on. Because such tables may, at least in some embodiments, have constraints on the kinds of structural changes that are permitted, the number of index sheet cells required to reference the table may be less than (M×N) in some embodiments—e.g., a set of cells comprising a single row (N cells) and a single column (M cells) may be used as proxies within the index sheet in one implementation. The number of index or proxy cells used for references to a table may not necessarily be (M+N) in some embodiments.

In at least one embodiment, a given index sheet 140 may include some number of proxy cells 145, but may also include non-proxy cells. Such non-proxy cells may be used as ordinary data sheet cells in various embodiments—e.g., the application 170 may use the non-proxy cells for values and/or expressions that do not refer to the master data sheet 130.

In some embodiments, the AAS 190 may support the deployment of local sheet recalculation (recalc) engines to various platforms where applications 170 may be deployed. In such a mode of operation, in effect, a local copy of an application 170 and the associated sheets 130 and 140 may be generated and stored at individual platforms (e.g., cell phones, tablet computing devices, laptops, desktops and the like). The local copies of the index and/or data sheets may be accessed and/or modified from the local copy of the application even when the deployment platform is offline in some embodiments, e.g., without requiring immediate synchronization with other copies or with the versions of the sheets stored at the DMS 120. More generally, independently-modifiable versions of index sheets, data sheets and/or the applications that use such sheets may be created and/or stored at various types of locations in some embodiments—e.g., at edge devices of a provider network, at the back-end servers used to implement a sheet-based data management service, and/or at client-side application deployment platforms such as phones, tablets and the like. By modifying such versions, different users such as application developers may be able to generate customized branched versions of the application that meet their specific needs, and use the branched versions to perform specific types of computations that may not be supported by other versions in at least some cases.

Figure 2:
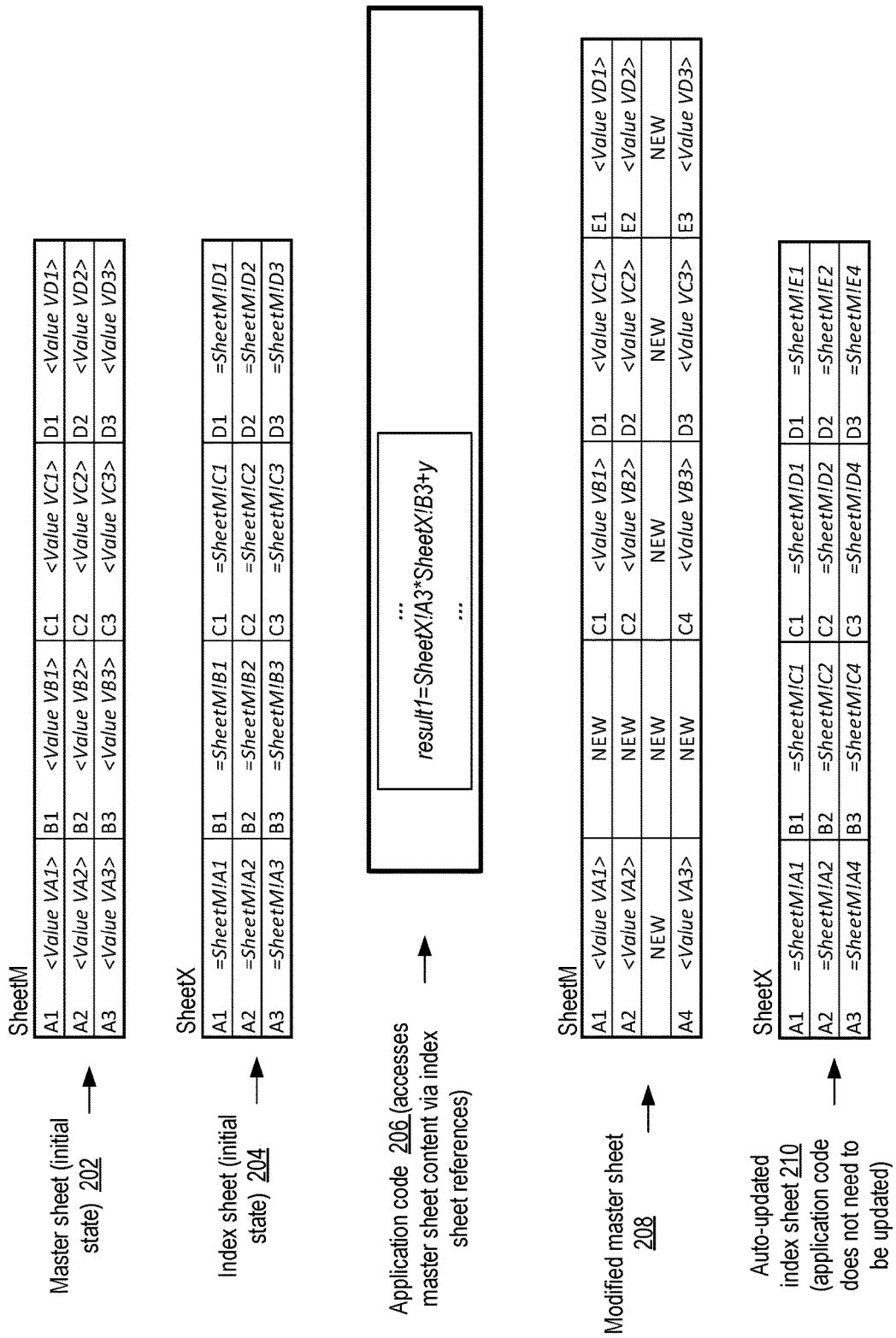
FIG. 2 illustrates a simple example of the use of an index sheet by an application, according to at least some embodiments.

According to one embodiment, an index structure other than a sheet may be used to indirectly access contents of data sheets from applications such as 170. For example, a one dimensional array of index entries may be used as an intermediary index between an application and data sheet in some embodiments. As long as the following invariants hold: (a) a structural change at the data sheet, which results in a change to a position of contents of the referenced cells, leads to an automatic update of the index entries, such that a given index entry continues to refer to the same content as before the structural change and (b) structural changes to the index itself, which could result to broken references (similar to dangling pointers) from within the application are not permitted, in some embodiments any desired type of index data structure may be used such as lists, arrays, or the like.
Example Use of Index Sheet FIG. 2 illustrates a simple example of the use of an index sheet by an application, according to at least some embodiments. In the depicted example scenario, two states of a portion of a master sheet (labeled "SheetM") and an associated index sheet (labeled "SheetX") are shown. Cells are identified by a positive integer indicating a row, and a letter indicating a column (e.g., cell A2 is in column A, row 2). In an initial state 202, twelve cells (A1-A3, B1-B3, C1-C3, and D1-D3) of SheetM contain respective values VA1-VA3, VB1-VB3, VC1-VC3, and VD1-VD3.

An index sheet SheetX, also comprising at least twelve (proxy) cells, may be created for the contents of the twelve cells shown in state 202, e.g., in response to a programmatic request from a client. The notation "=<master-sheet-ID>!<master-sheet-cell-coordinates>" is used in the index sheet in the depicted embodiment refer to the contents of cells of the master sheet. In the initial state of the index sheet 204, the proxy cells are shown comprising references to the contents of SheetM as SheetM existed in state 202—e.g., cell A1 of SheetX refers to cell A1 of SheetM, cell A2 of SheetX refers to cell A2 of SheetM, and so on. As mentioned earlier, while structural changes such as the addition of a row or column to data sheets such as SheetM may be permitted in various embodiments, similar structural changes may not be permitted in the range of cells used as proxy cells in the index sheet SheetX in at least some embodiments.

Code 206 of an application that uses data sheets may access contents of the master data sheet SheetM via the identifiers of the proxy cells of SheetX in the depicted embodiment. Various computations may be performed within the application code 206 upon the contents of SheetM indirectly, using SheetX as the intermediary, as shown: e.g., a result result1 may be computed by multiplying the referenced contents of SheetM's cells A3 and B3 using the proxy cells A3 and B3 of SheetX respectively.

In the depicted example scenario, a new row and a new column may be added to SheetM at some point, potentially altering the grid coordinates of the data that is being accessed for computations in the application. For example, as shown in state 208, the modifications to master sheet SheetM may include the insertion of a new row (with cells labeled "NEW") between the original rows 2 and 3, and the insertion of a new column (also with cells labeled "NEW") between the original columns A and B. As a consequence of these modifications, contents of several of the referenced cells may of SheetM have new grid coordinates in state 208—e.g., VA3, which used to be in cell A3, is now in cell A4, and VC2, which used to be in cell C2, is now in cell D2.

Figure 3:
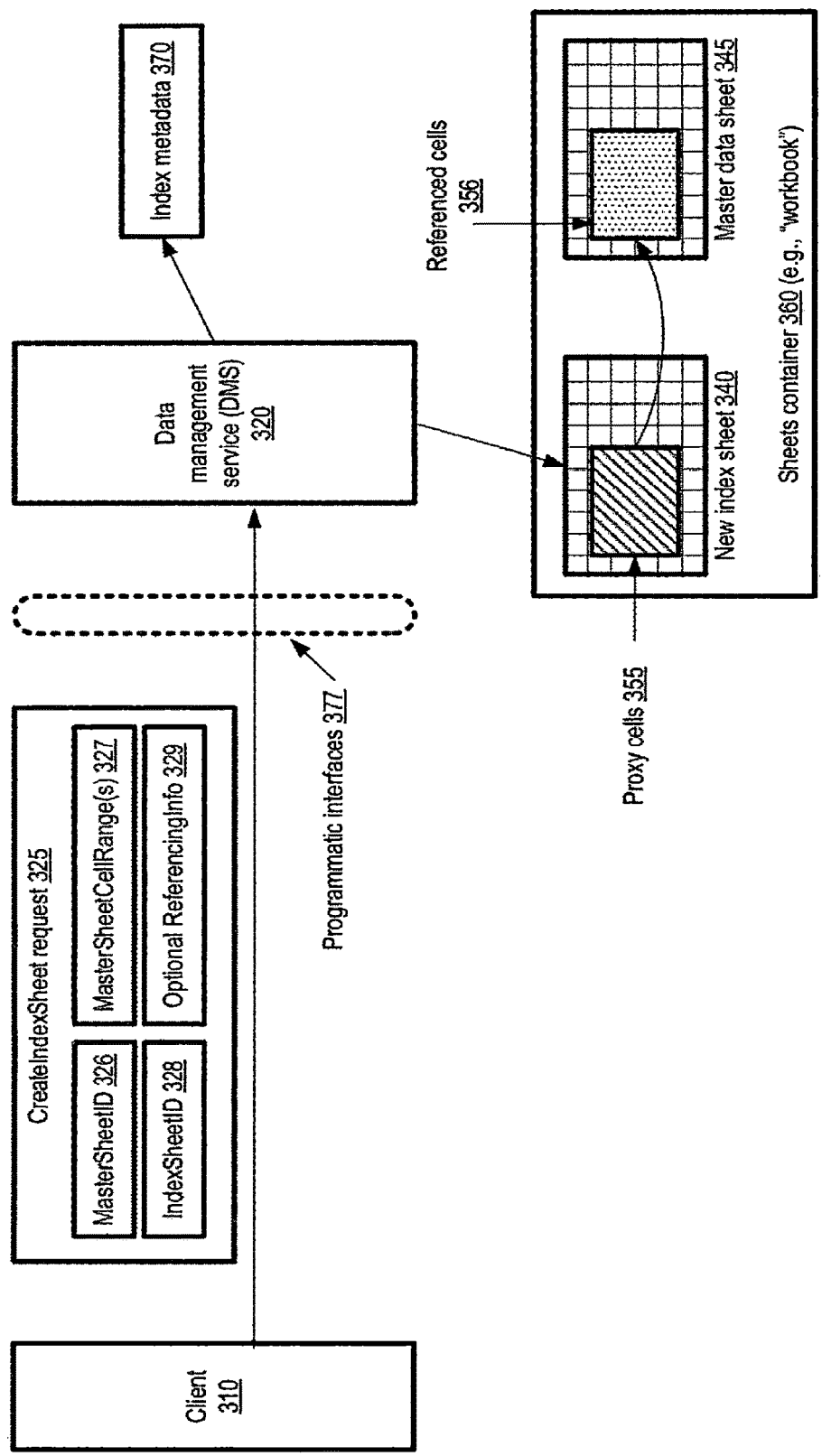
FIG. 3 illustrates an example of a programmatic request to create an index sheet, according to at least some embodiments.

As mentioned above, the references in the proxy cells may be updated automatically in various embodiments when such structural changes are made to the master data sheet. Thus, the expressions in proxy cells in row 3, column C and column D of SheetX may be automatically updated as shown, so that they still refer to the data that was being referred to prior to the structural modification of the master data sheet in the depicted example scenario. As a result, the application code 206 may continue to work, and no modifications to the application's code may be required in the depicted embodiment despite the changes to the master data sheet. In at least one embodiment, after proxy cells have been created/designated in an index sheet for a set of referenced cells in a data sheet, the set of operations that are permitted in the data sheet may also be restricted to some extent—e.g., certain types of sort operations or other operations may be prohibited.
Programmatic Interactions FIG. 3 illustrates an example of a programmatic request to create an index sheet, according to at least some embodiments. In the depicted embodiment, the data management service (DMS) 320 (which may comprise components similar to, and perform functions similar to those discussed in the context of DMS 120 of FIG. 1) may implement one or more programmatic interfaces 377, such as a set of APIs, command-line tools, graphical user interfaces and/or web-based consoles. Such interfaces may be used by a client 310 of the DMS to submit a request 325 to create an index sheet in the depicted embodiment. The request 325 may indicate, e.g., via a set of request parameters, that contents of at least a portion of one or more master data sheet(s) are to be accessed by an application indirectly via the requested index sheet in various embodiments. For example, the MasterSheetID parameter 326 may identify a master sheet, while MasterSheetCellRange(s) parameter 327 may identify a collection of cells of the master data sheet which may be referenced from the application. In at least one embodiment, the client may include a name or identifier of the desired index sheet (e.g., via the IndexSheetID parameter 328). In some embodiments, another parameter ReferencingInfo 329 of the CreateIndexSheet request 325 may optionally indicate one or more formulas, which may for example be used instead of explicitly specifying the MasterSheetCellRange(s) parameter. Note that at least in some embodiments, instead of directly indicating, within the index sheet, the range of cells of the data sheet that are to be accessed via a corresponding range of proxy cells, an expression that refers to the data sheet cells may be used to indicate the referenced cells. For example, if a proxy cell in the index sheet contains the expression "=SUM(SheetM![A36:A42])", where SheetM is the data sheet and the "SUM[cell-range]" function computes the sum of the values in the indicated cell-range, this may indicate in various embodiments that the data sheet cells in range A36-A42 are to be accessed indirectly from the index sheet.

In response to receiving the request 325, one or more components of the DMS 320 may generate and store a new index sheet 340 corresponding to an existing master data sheet 345. Proxy cells 355 of the new index sheet 340 may comprise immutable references to the contents of the set of referenced cells 356 (whose coordinates may have been indicated by the MasterSheetCellRange(s) parameter 327) in the depicted embodiment. Index metadata 370, indicating the relationship between the new index sheet and the master data sheet, and/or permissions information that prohibits some types of structural changes to the index sheet 340, may also be stored by the DMS in various embodiments. In at least one embodiment, if the master data sheet 345 is part of a container or workbook 360, by default the new index sheet 340 may also be created in the same workbook.

According to at least one embodiment, a master data sheet and a corresponding index sheet may be created together as part of a single logically atomic operation—e.g., in response to a programmatic request from a client to create both a new data sheet and a new index sheet that includes proxy cells that reference at least a portion of the new data sheet. Content (e.g., literals, expressions, formulas etc.) may be entered later into the data sheet in such embodiments.

Use of Non-Proxy Cells of Index Sheets

Figure 4:
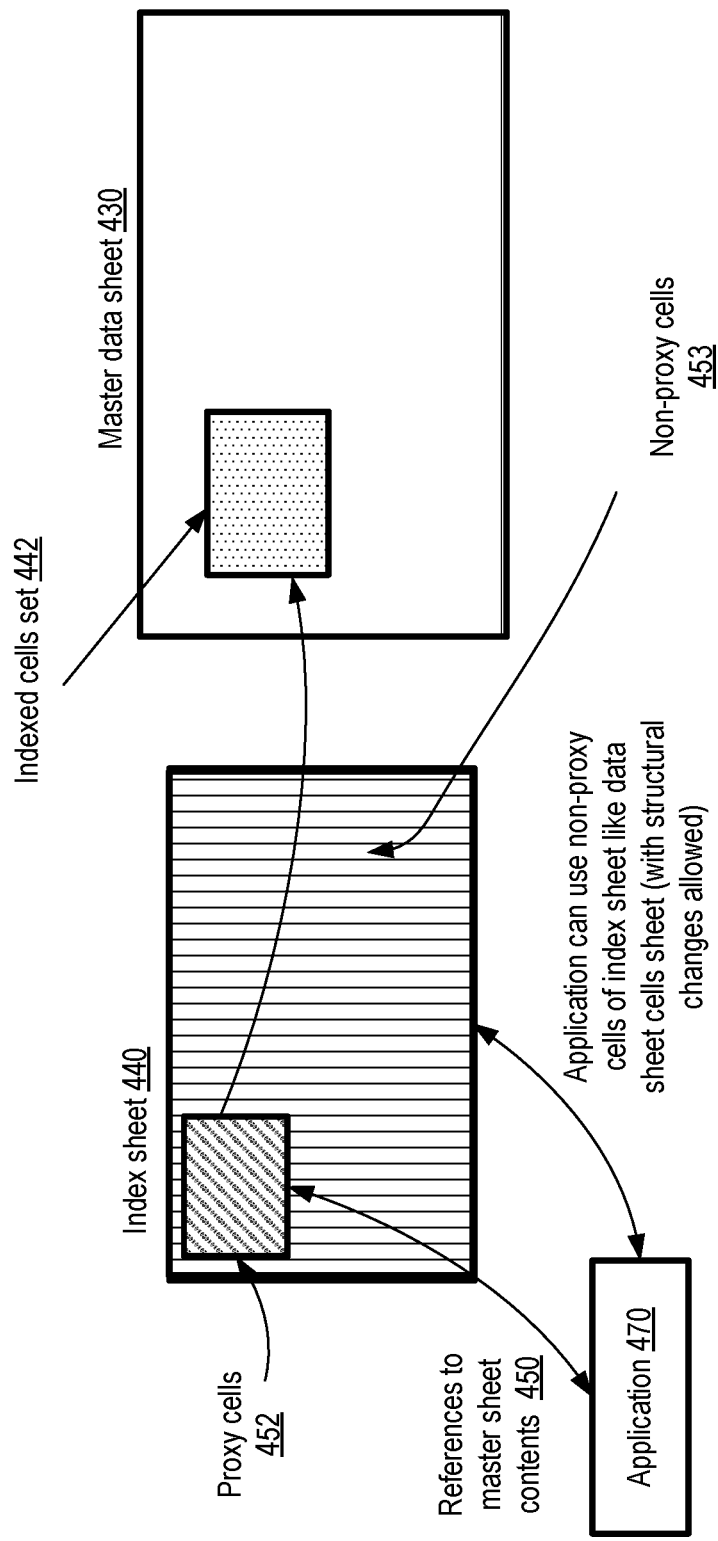
FIG. 4 illustrates an example scenario in which an application may utilize non-proxy as well as proxy cells of an index sheet, according to at least some embodiments.

From the perspective of an application author or developer, in at least some embodiments one or more cells of an index sheet that do not serve as proxies for contents of data sheets may be used as "regular" or non-indexing cells, e.g., to store expressions, similar to the way that cells of data sheets may be used. FIG. 4 illustrates an example scenario in which an application may utilize non-proxy as well as proxy cells of an index sheet, according to at least some embodiments.

In the depicted embodiment, an index sheet 440 may have been created, to be used as an intermediary to access contents of indexed cells set 442 of a master data sheet. The index sheet 440 may comprise a set of proxy cells 452 to be used by the application 470 for references 450 to master sheer contents. At least a portion of the remaining or non-proxy cells 453 may be used like the cells of an ordinary data sheet, e.g., with structural changes permitted (as long as the structural changes do not affect the structure of the proxy cell region) in various embodiments.

Independently-Modifiable Versions of Applications and Sheets

Figure 5:
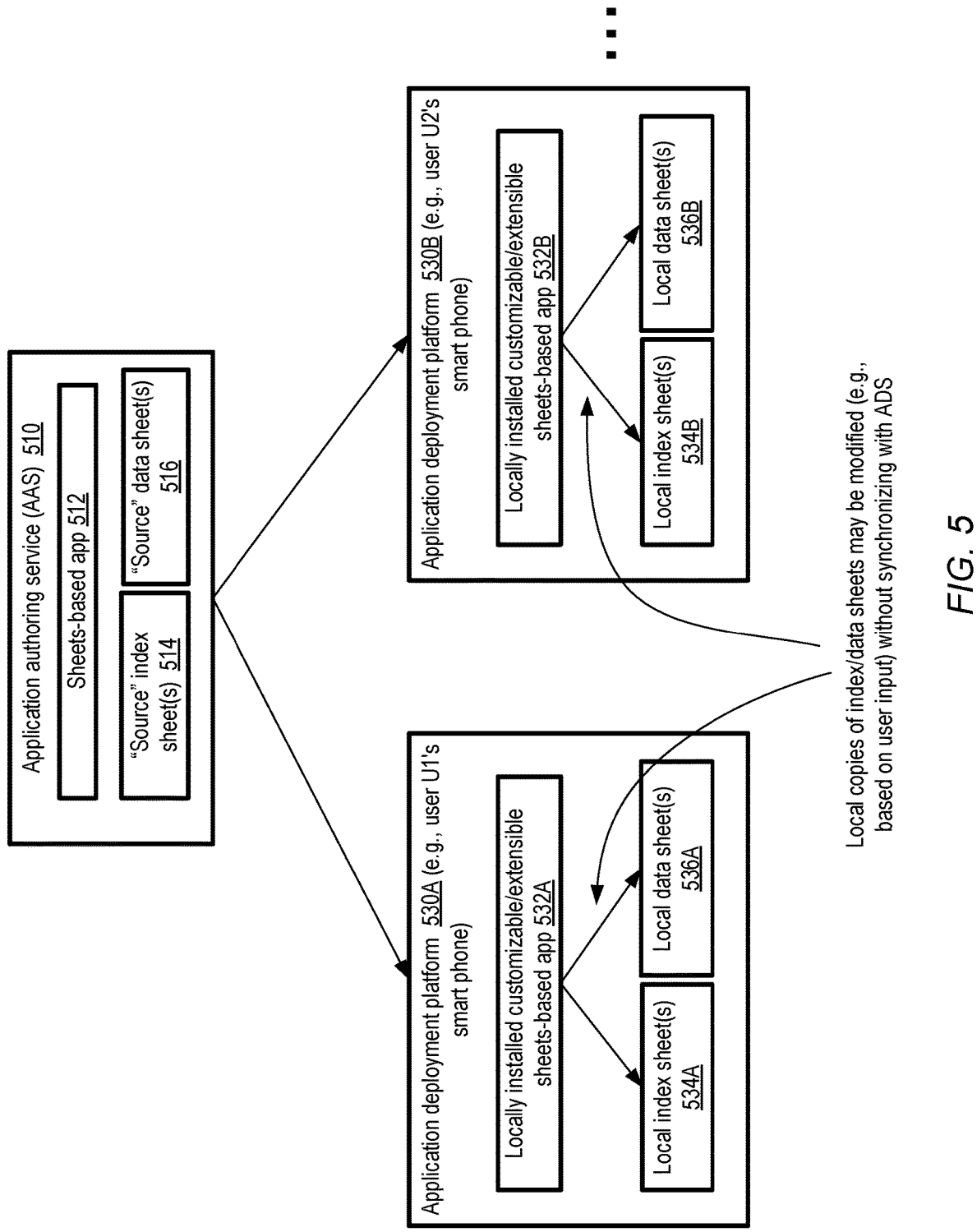
FIG. 5 illustrates an example scenario in which independently-modifiable versions of index sheets may be stored at respective platforms, according to at least some embodiments.

FIG. 5 illustrates an example scenario in which independently-modifiable versions f index sheets may be stored at respective platforms, according to at least some embodiments. As mentioned earlier, in some embodiments, applications that utilize sheets may be deployed to various platforms together with a local copy of a sheet recalculation ("recalc") engine, so that calculations using local versions of the sheets may be performed at the platforms themselves, without requiring connectivity to the data management service and/or the application authoring service where the sheets and application were originally created.

In the embodiment shown in FIG. 5, a sheets-based application 512 (an application which accesses and manipulates data stored in sheets of the kind described earlier) may be authored and tested at an application authoring service 510 (similar in capabilities to application authoring service 190 of FIG. 1). The sheets-based application 512 may utilize one or more source data sheets 516 and corresponding index sheets 514.

After the application 512 has been developed and tested, it may be deployed to a variety of execution platforms. For example, numerous users may download the application to respective smart phones, tablet computing devices, laptops, desktops and the like in some embodiments. Together with the locally installed versions of the application 512, which may include a local instance of a recalc engine, independently-modifiable versions of the sheets (e.g., index sheets and/or data sheets) used by the application may also be stored at the execution platforms 530 (e.g., 530A or 530B) in some embodiments. As shown, application deployment platform 530A, such as a user U1's smart phone, may comprise locally installed customizable/extensible version 532A of the sheets-based app 512 in the depicted embodiment, while deployment platform 530B (e.g., a different user U2's smart phone) may comprise its own locally installed customizable/extensible version 532B of the app in the depicted embodiment. Local independently-modifiable versions of index sheets 534A and 534B corresponding to the source index sheets 514, and local independently-modifiable versions of data sheets 536A and 536B may be created at the respective execution platforms 530A and 530B for use by the local application versions.

In various embodiments, the local copies of the index and/or data sheets may be modified (e.g., based on user input via touch screens or other interfaces), at least for some intervals, without synchronizing the local copies with one another or with the source copies. In some embodiments, the local copies may be use during periods when the deployment platforms are offline or disconnected from the source sheets. In one embodiment, during periods when the deployment platforms have connectivity to the source version(s) of the data and/or index sheets, the local versions may optionally be synchronized with the source versions. In at least one embodiment, the deployment of the copies of the sheets may enable users to modify the originally-installed application versions, in effect creating personalized or branched versions for their own use. Results generated by the personalized versions of the applications may be provided to individual users of the deployment platforms in the depicted embodiment. Because a spreadsheet-based data model is used for the applications 512 and 532, and because a local instance of a recalc engine is deployed as part of the application, in some embodiments it may be much easier for users to extend or personalize the applications than if more traditional approaches towards data were used (e.g., if a relational database were used).

In at least some embodiments, independently-modifiable versions of the index sheets, data sheets and/or applications may be generated and/or stored at other types of platforms than the client-side application deployment platforms indicated in FIG. 5. For example, such versions may be stored at edge devices of a provider network (e.g., computing devices that may not be located in the data centers where back-end processing of the data management service is performed, but instead at premises closer to the end users of the data management service), or even at the back-end servers used to implement the data management service in different embodiments.

Table-Related Index Sheet Optimizations

Figure 6:
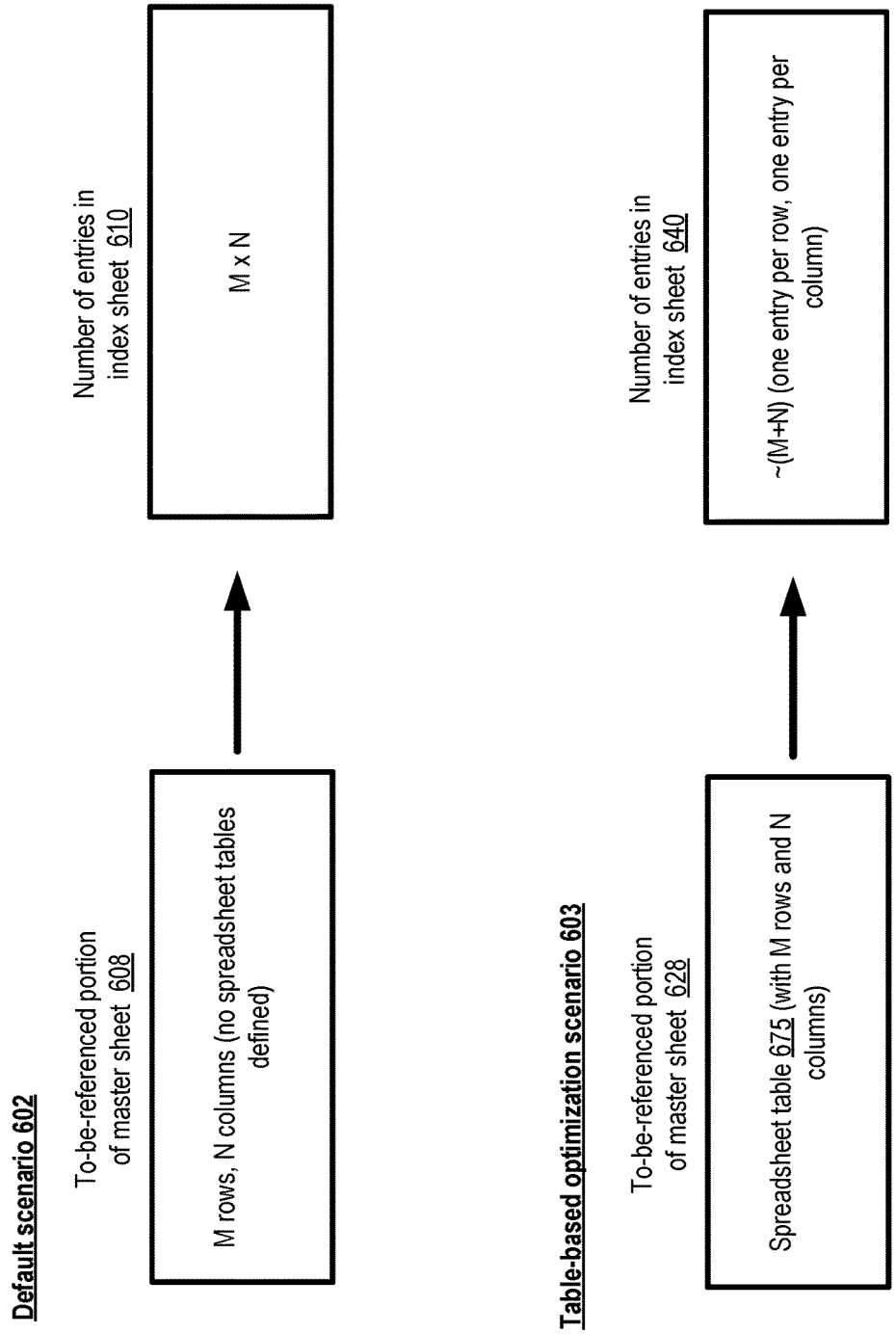
FIG. 6 illustrates examples of the number of index sheet entries which may have to be stored, depending on whether a referenced portion of a data sheet comprises a table, according to at least some embodiments.

The amount of indexing-related metadata and/or data that is stored at the data management service (and/or at deployment platforms) may vary based on the logical or spatial grouping (and associated constraints) of contents of the referenced data sheets in some embodiments. FIG. 6 illustrates examples of the number of index sheet entries which may have to be stored, depending on whether a referenced portion of a data sheet comprises a table, according to at least some embodiments.

In a default scenario 602, by default if there are (M×N) cells in a region 608 of a master data sheet (e.g. with M rows and N columns) that may be referenced via an index sheet, and the data sheet cells are not grouped or defined specifically as a spreadsheet table, (M×N) cells in the index sheet may be reserved or set aside as proxies for the data sheet cells. As such, the number of index entries 610 may also be (M×N) in the default scenario.

In contrast, in table-based optimization scenario 603, a user may have created a spreadsheet table 675 with M×N cells, and the to-be-referenced portion 628 of the data sheet may comprise the table 675. A spreadsheet table 675 may be generated, for example, to indicate that a sub-grid of M rows and N columns in a data sheet contains related data, and various types of computations and formatting operations may be performed using tabular semantics for the sub-grid—e.g., a row of totals for columns containing numeric quantities may be automatically generated, the cells of a table may be automatically formatted differently from cells that are not part of the table, the entire table may be resized as a unit using specialized user interface controls, and so on. Because such tables may, at least in some embodiments, have constraints on the kinds of structural changes that are permitted, the number of index sheet cells required to reference the table may be less than (M×N) in the depicted embodiment. For example, one entry per row and one entry per column may be required for the index, resulting in approximately (M+N) entries in the index sheet 640 in some embodiments. For applications built using spreadsheet tables, the reduction in the number of index entries from (M×N) for each table to approximately (M+N) for each table may represent a substantial savings in space requirements and/or recalculation-related computation requirements in various embodiments. The approximately (M+N) cells in the index sheets may be referred to as cell range indicators with respect to the referenced cells in some embodiments, as individual ones of the index sheet cells may refer to a contiguous group of cells in a row or a column.

In the spreadsheet table scenario discussed above, the referenced cells may comprise a contiguous rectangular region as indicated in FIG. 6. In at least some embodiments, similar techniques for saving space in the index sheets may be employed for groups of cells of the data sheet that are not necessarily contiguous—for example, a plurality of cells in two non-contiguous columns, or in non-contiguous rows. The count of index sheet cells used to reference such non-contiguous referenced cells may also be reduced by using cell range indicators in the index sheet in various embodiments, e.g., as part of a formula/expression, so that the total number of cells used in the index sheet is smaller than the total number of cells that are being referenced.

Usage Modes of Index Sheets

Figure 7:
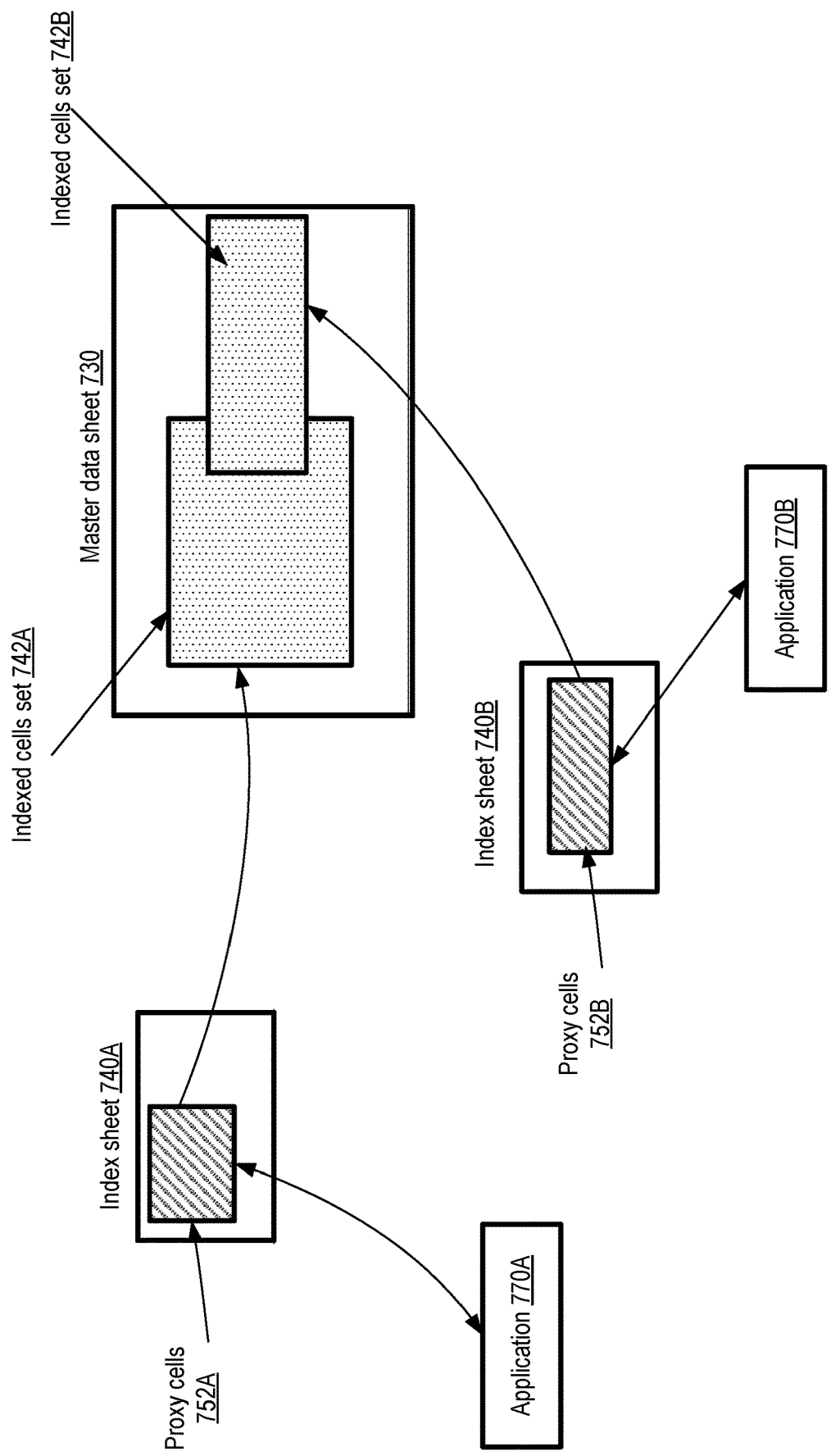
FIG. 7 illustrates an example scenario in which multiple index sheets may be created for a single data sheet, according to at least some embodiments.

The number of index sheets that are created for accessing contents of a given data sheet, the extent to which the referenced or indexed data sheet cells may overlap, and/or the number of index sheets that may be used by a given application, may vary in at least some embodiments, resulting in a variety of index sheet usage modes. FIG. 7 illustrates an example scenario in which multiple index sheets may be created for a single data sheet, according to at least some embodiments. As shown, a master data sheet 730 may comprise two ranges of indexed cells, 742A and 742B in the depicted embodiment.

A separate index sheet may be generated and stored for the two sets of indexed or referenced cells in the depicted embodiment. For example, index sheet 740A with proxy cells 752A referencing set 742A may be created for use by application 770A, while index sheet 740B with proxy cells 752B referencing set 742B may be created for use by a different application 770B. In at least some scenarios, the indexed cell ranges 742A and 742B may overlap—e.g., some cells that are referenced from index sheet 740A may also be referenced from index sheet 740B. In at least some embodiments, any desired number of index sheets may be set up for accessing respective portions of a given data sheet.

Figure 8:
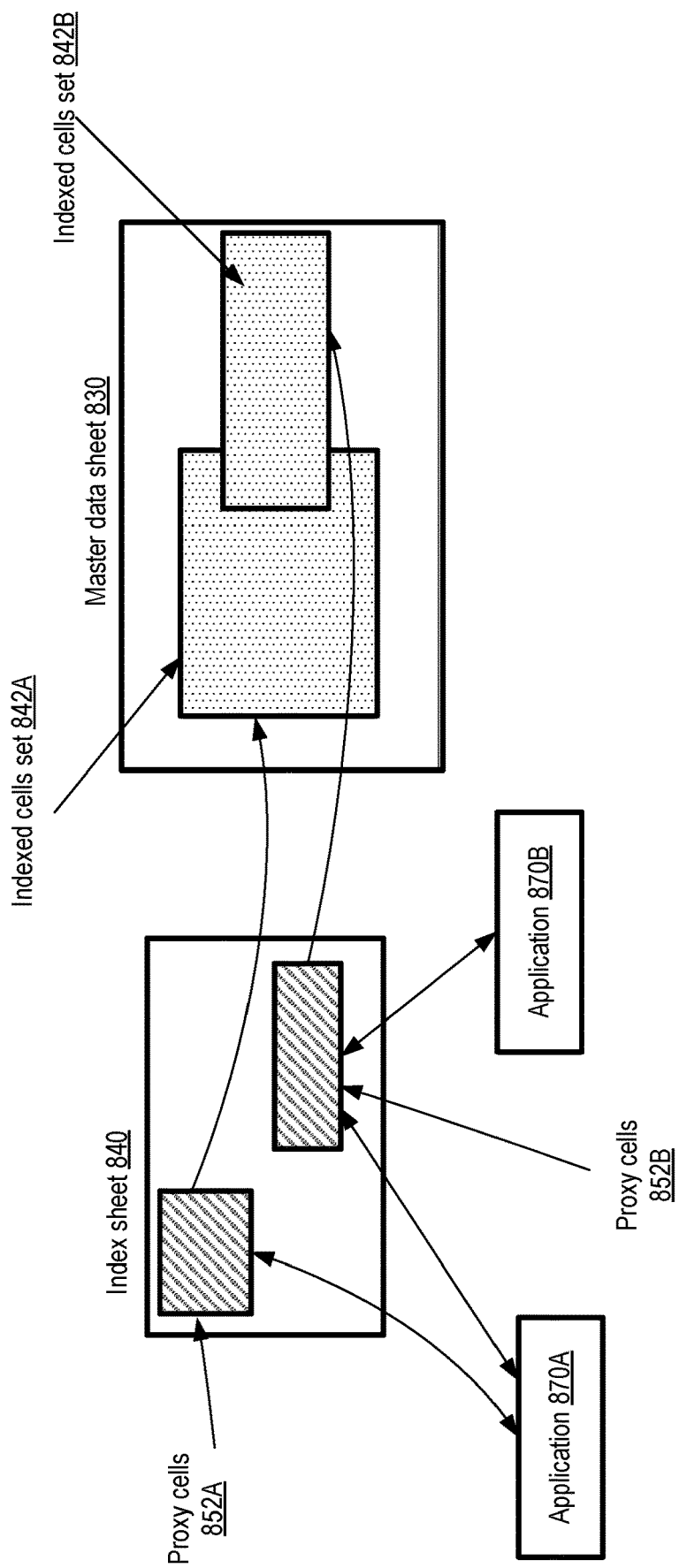
FIG. 8 illustrates an example scenario in which multiple applications may utilize a given index sheet, according to at least some embodiments.

FIG. 8 illustrates an example scenario in which multiple applications may utilize a given index sheet, according to at least some embodiments. As shown, a master data sheet 830 may comprise at least two sets of indexed cells 842A and 842B in the depicted embodiment. A single index sheet 840 may comprise two sets of proxy cells, 852A referencing indexed cell set 842A, and 852B referencing indexed cell set 842B.

A given application 870 may utilize one or more of the sets of proxy cells 852 to access contents of the master data sheet 830 in the depicted embodiment. For example, application 870A may use proxy cells 852A as well as 852B, while application 870B may access only proxy cells 852B in the example shown. In at least some embodiments, the sets of proxy cells such as 852A and 852B may not necessarily overlap with one another, even if the corresponding sets of indexed cells 842A and 842B do overlap with one another. In some embodiments, a parameter of the programmatic request (similar to the request shown in FIG. 3) to create index sheets may specifically identify the range (e.g., using grid coordinates of the index data sheet) of cells to be used as proxy cells. In at least one embodiment, the data management service may also fulfill programmatic requests to modify index sheets after they have been created. For example, index sheet 840 may initially be created to refer to indexed cells set 842A alone in the depicted embodiment, and a separate request to add/designate proxy cells 852B for references to indexed cell set 842B may be submitted later. The metadata stored for index sheets (and/or master data sheets) may include access permissions that can be used to allow shared access to multiple applications (such as 870A and 870B) and/or multiple groups of users in various embodiments.

Figure 9:
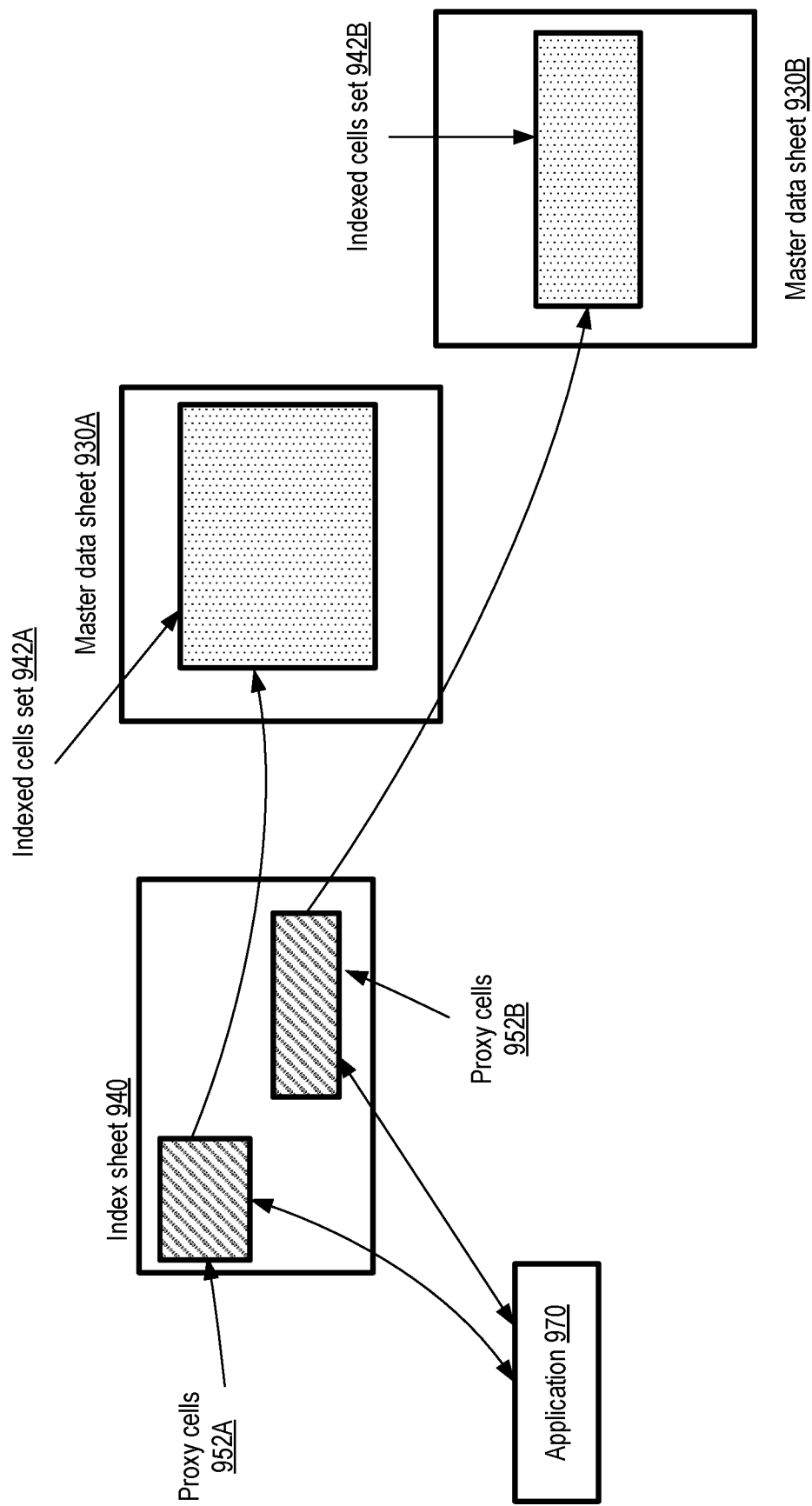
FIG. 9 illustrates an example scenario in which multiple data sheets may be referenced from a given index sheet, according to at least some embodiments.

FIG. 9 illustrates an example scenario in which multiple data sheets may be referenced from a given index sheet, according to at least some embodiments. In the depicted example scenario, proxy cell set 952A within index sheet 940 may refer to contents of indexed cells set 942A or master data sheet 930A, while proxy cells 952B of the same index sheet 940 may refer to indexed cells set 942B of a different master data sheet 930B. A given application 970 (or any desired number of applications) may access the contents of multiple data sheets via the proxy cells of a single index sheet in the depicted embodiment.

In some embodiments, a programmatic request submitted to create an index data sheet 940 may indicate multiple tuples representing (indexed cells set, proxy cells set) combinations to support the kind of configuration shown in FIG. 9. In at least one embodiment, as mentioned earlier, new ranges of proxy cells and corresponding indexed sells may be designated for an existing index sheet in response to an index sheet modification request received via a programmatic interface at the data management service.

Figure 10:
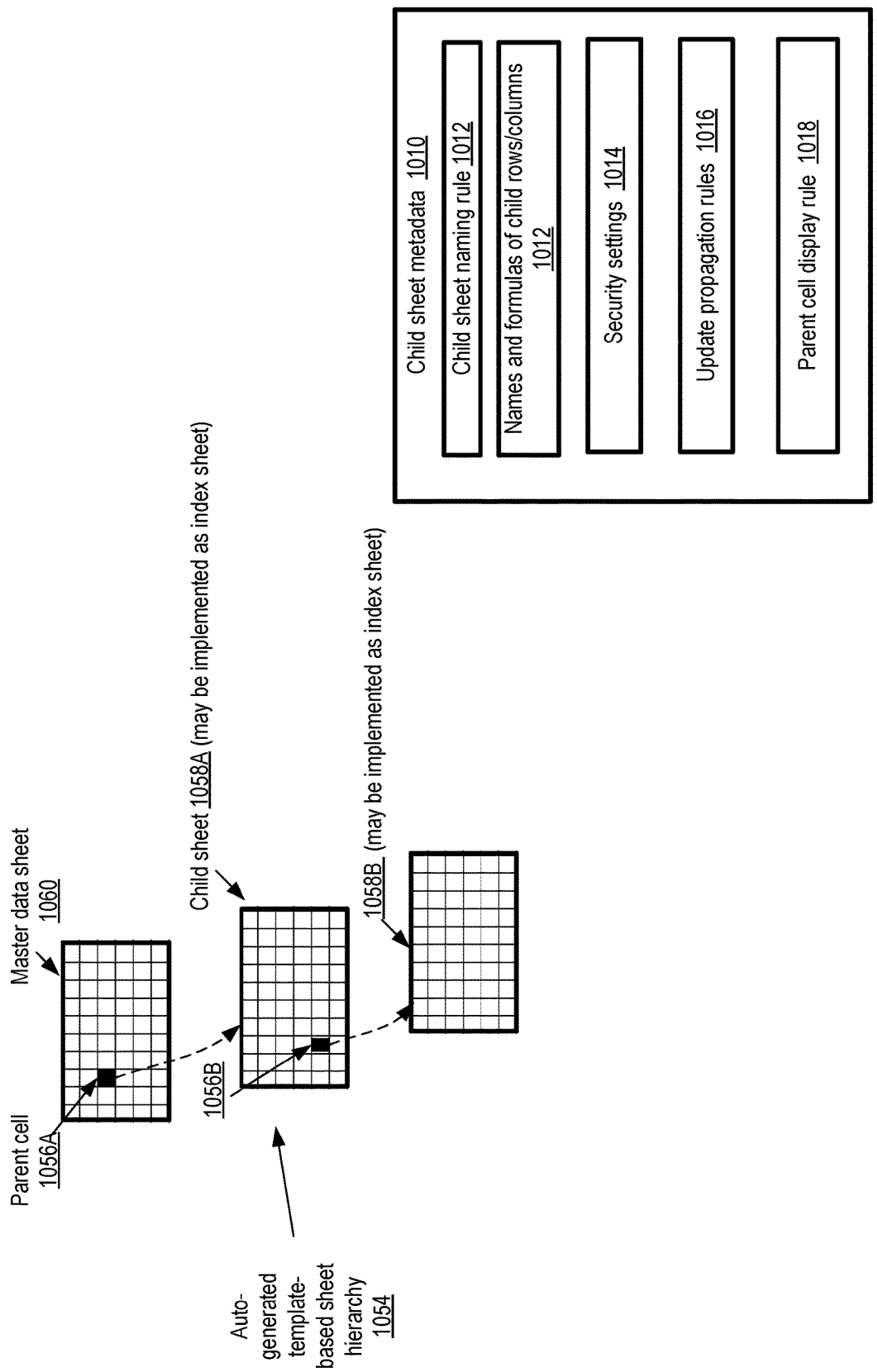
FIG. 10 illustrates an example scenario in which template-based sheet hierarchies may be implemented using index sheets, according to at least some embodiments.

As mentioned earlier, in at least some embodiments, a web-of-sheets data model in which template-based hierarchies of sheets are instantiated automatically may be supported at a data management service. FIG. 10 illustrates an example scenario in which template-based sheet hierarchies may be implemented using index sheets, according to at least some embodiments. In the depicted embodiment, one or more cells such as 1056A of a master data sheet 1060 may be designated as "parent" cells. When data is entered into such a parent cell, one or more child data sheets such as 1058A and 1058B may be generated and stored automatically as part of a sheet hierarchy 1054 in the depicted embodiment. Each sheet (except the root or highest-level member) in the hierarchy may be associated with a parent cell—e.g., parent cell 1056B corresponds to child sheet 1058B, while parent cell 1056A corresponds to child sheet 1056B in the depicted example. In at least some embodiments, child sheets such as 1058A and 1058B may be implemented as index sheets—e.g., at least some cells of the child sheets may comprise immutable references to cells in the corresponding parent sheets. In some embodiments, an empty child sheet may be instantiated based on a client-specified template when a parent cell is created, with at least some of the cells of the child sheet being left unpopulated until a user navigates to the parent cell or to some cell of the child sheet. In some cases, allocation of memory/storage for the cells of the child sheet may be deferred until a user navigates to the parent cell or the child sheet.

FIG. 10 also shows illustrates example contents of metadata 1010 which may be used to create child data sheets, according to at least some embodiments. As shown, metadata 1010 may comprise a child sheet naming rule 1012, names and formulas 1012 of columns/rows of the child sheet, security settings 1014, update propagation rules 1016, and/or a parent cell display rule 1018 in the depicted embodiment.

The child sheet naming rule 1012 may indicate how the child sheet is to be referred to from elsewhere in the workspace or the parent sheet. For example, in some embodiments, at the request of the client, each child sheet (which may be created as an index sheet) may be given a unique name selected by the client, such as "Pki-EventDetails" where the "Pki" component of the name indicates that the parent cell is in the $i^{th}$ row and the $k^{th}$ column of a parent sheet P, and the "EventDetails" portion indicates that the child sheet contains details regarding an event summarized in the parent sheet. In other embodiments, the child sheet may simply be referred to by default using the parent cell as an indirect identifier or pointer, and no unique name may be generated by the service.

Names and formulas 1012 for various columns and/or rows of the child sheet may be specified by the client (e.g., by example) and stored as part of the metadata 1010 in some embodiments. For example, a client may create a logical table within a particular data sheet DS-C, with various named columns and associated formulas, and then designate a cell of another sheet DS-P as a parent cell for DS-C, thereby providing the column names by example in one embodiment. In another embodiment, the names and/or formulas may be entered via a form-like interface.

Security settings 1014 may indicate, for example, the entities (e.g., users or groups registered in an identity management system used by the data management service) which are granted various types of access permissions to all or part of the child sheet in the depicted embodiment. In some embodiments, the security settings may also indicate portions of the child data sheet whose values are to be "locked" (i.e., designated as unmodifiable). In one embodiment, security settings 1014 may also be used to indicate whether a subset of a parent sheet is to be hidden to viewers/editors of the child sheet.

Update propagation rules 1016, which may be part of the security settings 1014 in some embodiments, may indicate whether, and in which directions, updates made to a child sheet or a parent sheet are to be propagated automatically. For example, for some portions of a child sheet, a copy-up rule 1044 may indicate that whenever a change is made to a value in those portions of the child sheet, any cells of the parent sheet which refer to those child cells are to be updated automatically. Similarly, with respect to some portions of a parent sheet, a copy-down rule 1044 may indicate that whenever a change is made to a value in those portions of the parent sheet, any cells of the child sheet which refer to those parent cells are to be updated automatically.

A parent cell display rule 1018 may indicate how the values or labels to be displayed in the parent cell are to be determined. For example, in some embodiments, an abbreviated version of the name of the child sheet may be displayed within the parent cell. In other embodiments, a portion of the contents of the child sheet (selected by the client) may be displayed. In some embodiments, when a user clicks on the parent cell, the child sheet may be displayed automatically, e.g., in a new panel, tab, or window or in the same panel, tab or window as the parent cell. Interface elements (such as "back-to-parent" arrows or "back-to-child" arrows in a toolbar) allowing clients to move back and forth easily between child sheets and their parent cells may be implemented in at least some embodiments. Note that in at least some embodiments, child sheets may not be implemented using index sheets.

Provider Network Environment

Figure 11:
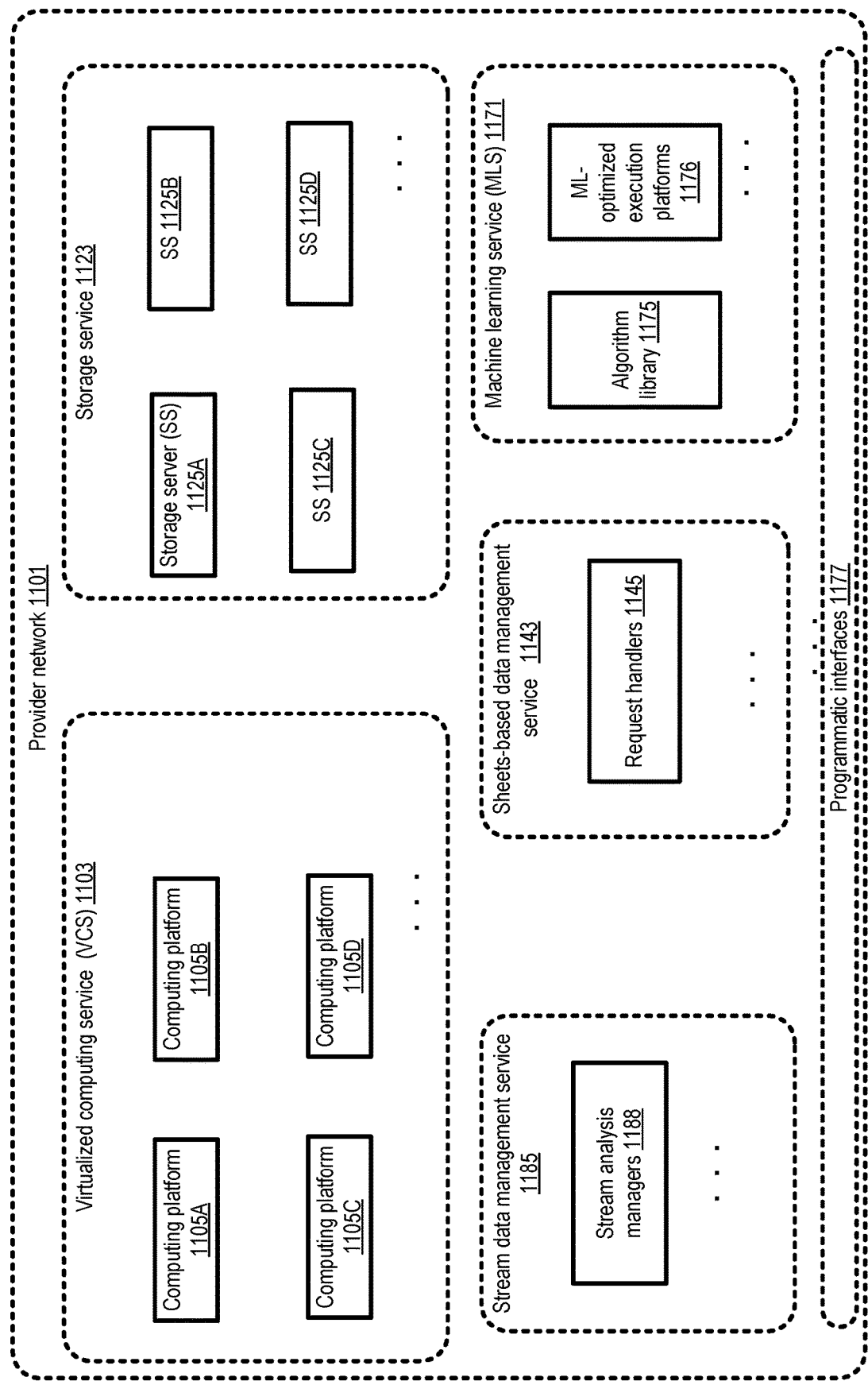
FIG. 11 illustrates an example provider network environment in which a data management service may be implemented, according to at least some embodiments.

As mentioned earlier, in some embodiments a data management service which supports the web of sheets data model, including index sheets of the kind discussed above, may be implemented as part of a provider network. FIG. 11 illustrates an example provider network environment in which a data management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 1101 may comprise resources used to implement a plurality of services, including for example a virtualized computing service 1103, a storage service 1123, a machine learning service 1171, a stream data management service 1185, and a sheets-based data management service 1143 at which index sheets of the type discussed above may be created and used. Components of a given service may utilize components of other services in the depicted embodiment—e.g., for some machine learning tasks, a component of the machine learning service 1171 may utilize virtual machines implemented at computing platforms such as 1105A-1105D of the virtualized computing service, the raw data and/or metadata for various data sheets and/or index sheets managed using the data management service 1143 may be stored at storage servers 1125 (e.g., 1125A-1125D) of storage service 1123, stream data records captured and processed at stream analysis managers 1188 of stream data management service 1185 may be stored at storage service and so on. Individual ones of the services shown in FIG. 11 may implement a respective set of programmatic interfaces 1177 which can be used by external and/or internal clients (where the internal clients may comprise components of other services) in the depicted embodiment.

As shown, the sheets-based data management service 1143 may comprise, among other components, one or more request handlers 1145 in the depicted embodiment. The request handlers 1145 may respond to client-submitted programmatic requests, enabling clients to create, populate, read, modify and delete various types of data sheets and index sheets, including sheets arranged in hierarchies as discussed earlier.

The sheets-based data management service may interact with one or more other services of the provider network in at least two ways in the depicted embodiment. First, resources of other services, such as computing platforms 1105 or storage servers 1125 may be used to perform some of the computations involved in sheet management, and/or to store sheet data or metadata. In some embodiments, processing associated with data sheets may be performed using virtual machines of VCS 1103, while in other embodiments, non-virtualized machines or a combination of virtual and physical machines may be used. Similarly, any desired combination of virtualized or physical storage devices of storage service 1123 may be used for sheets in various embodiments. In some embodiments, to enable fast processing of data in large sheet hierarchies, computing platforms with large amounts of main memory may be utilized, so that frequent memory-to-disk or disk-to-memory transfers are avoided. In some embodiments, a separate virtualized memory service may be implemented at the provider network 1101 and used to support data and/or index sheets. The storage service 1123 and/or the VCS 1103 may each provide high levels of availability, data durability, and failure resilience, enabling workloads of a large collection of sheets customers to be handled in various embodiments.

In at least some embodiments, the sheets-based data management service 1143 may also serve as an intermediary resource for analyzing and displaying data collected at other services. For example, records collected at the stream data management service 1185 may be exposed to clients via data sheets, with the results of various types of stream analysis algorithms (such as anomaly detection algorithms) being shown to users via charts and other displays generated using data management service 1143's functionalities. Similarly, the results of various types of machine learning algorithms 1175, computed for example at machine-learning optimized execution platforms 1176 (such as GPU-equipped servers) may be displayed via data sheets of the data management service 1143 in various embodiments. Application programming interfaces (APIs) may be used to transfer data from other services to the data management service in at least some embodiments. In various embodiments, the sheets-based data management service 1143 may implement easy-to-use data connector interfaces, built on top of the service's application programming interfaces, to allow data generated at other provider network services and/or at various data sources of the public Internet to be transferred into data sheets.

In some embodiments, at least some of the techniques discussed above for managing data and index sheets, associated applications and the like may be accomplished using non-specialized computing platforms of the virtualized computing service 1103. In some embodiments, techniques for supporting the web-of-sheets data model, including index sheets, may be implemented without acquiring resources of network-accessible services such as those shown in FIG. 11. For example, a standalone tool implemented at one or more computing devices which are not part of a network-accessible service may be used in some embodiments.

Methods for Enhancing Application Robustness Using Index Sheets

Figure 12:
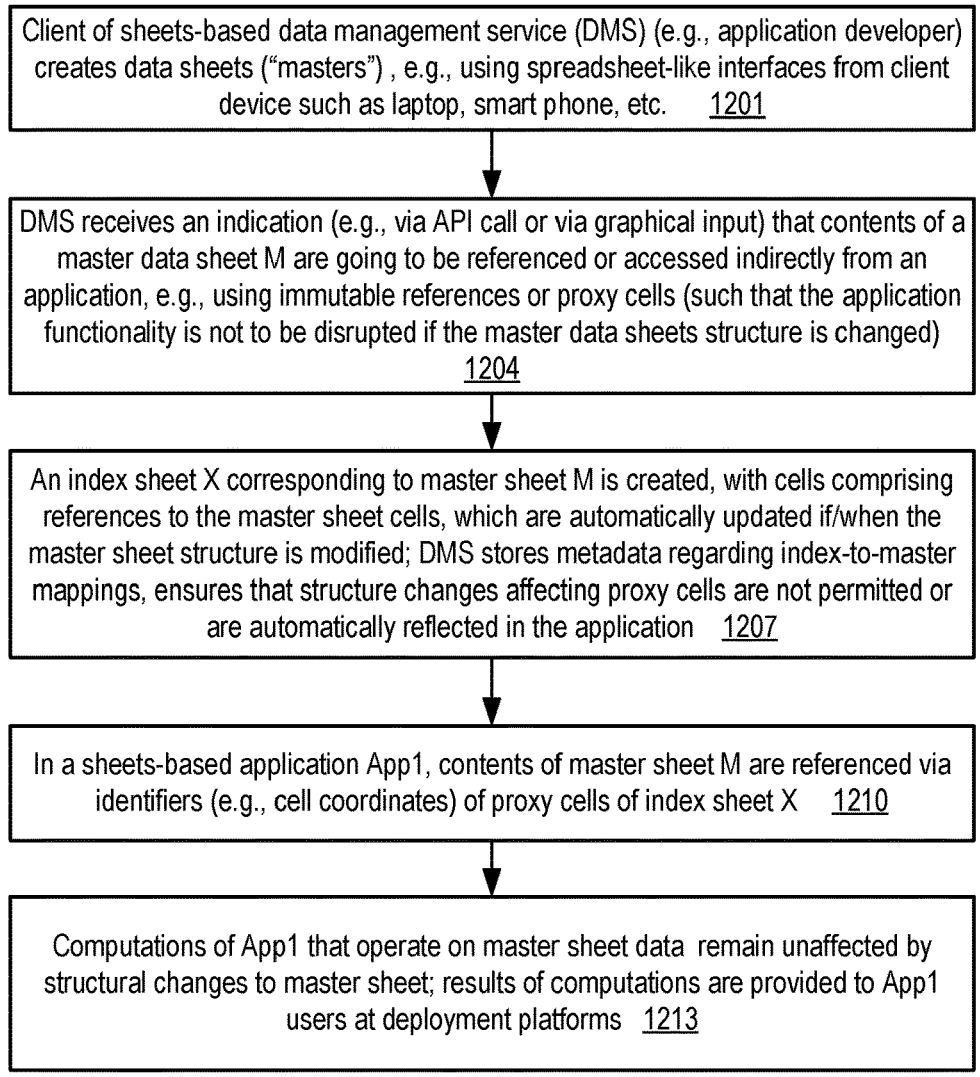
FIG. 12 is a flow diagram illustrating aspects of operations that may be performed to increase the robustness of sheets-based applications using index sheets, according to at least some embodiments.

FIG. 12 is a flow diagram illustrating aspects of operations that may be performed to increase the robustness of sheets-based applications using index sheets, according to at least some embodiments. As shown in element 1201, a client of a sheets-based data management service (DMS) (e.g., an application author/developer) may create one or more data sheets ("masters"), e.g., using spreadsheet-like interfaces from a client device such as laptop, smart phone, etc. in various embodiments.

The DMS may receive an indication (e.g., via API call or via graphical input) that contents of a master data sheet M are going to be referenced indirectly from an application, e.g., using immutable references or proxy cells (such that the application functionality is not to be disrupted if the master data sheets structure is changed) (element 1204). In some embodiments, a client of the DMS may simply submit a request to create an index sheet to be used to reference specified portions of a master data sheet, and an indication of the specific application or applications which may utilize the index sheet may not necessarily be provided.

In response to the indication of a client's requirement for indirect referencing, an index sheet X corresponding to master sheet M may be created in the depicted embodiment (element 1207). The cells of the index sheet may comprise references to the master sheet cells in various embodiments; the index sheet cells may be automatically updated if/when the master sheet structure is modified such that the references continue to point to the same content that was being pointed to before the structure modification (e.g., an addition of a row, column or some number of cells in the master data sheet M). The DMS may store metadata regarding index-to-master mappings in various embodiments, and may ensure that structure changes affecting the referencing or proxy cells of the index sheet are not permitted in at least some embodiments. In other embodiments, at least some types of structural changes to the proxy cells may be permitted, and such changes may be reflected automatically within the applications which use the proxy cells to refer to the data sheets—that is, the applications may be updated automatically upon a detection of a particular structural change to the index sheet which affects the application, without requiring manual modifications to the application.

In the code of a sheets-based application App1, contents of master sheet M may be accessed or referenced via identifiers (e.g., cell coordinates) of the proxy cells of index sheet X in various embodiments (element 1210). Computations of App1 that operate on master sheet data may remain unaffected by structural changes to the master sheet; results of such computations may be provided to App1 users at or from platforms where App1 is deployed in the depicted embodiment. Note that at least in one embodiment, a data structure other than a two-dimensional grid may be used for the index, as long as the index entries are automatically updated to allow indirect references from applications to the master data sheet contents to remain unaffected by structural changes to the master data sheet.

It is noted that in various embodiments, some of the operations shown in FIG. 12 may be implemented in a different order than that shown in the figure, or may be performed in parallel rather than sequentially. Additionally, some of the operations shown in FIG. 12 may not be required in one or more implementations.

Use Cases

The techniques described above, of supporting index sheets as an indirect referencing mechanism or intermediary for content stored in data sheets of a network-accessible data management service, may be useful in a variety of scenarios. Numerous small business owners or individuals who are not experts in database technology, or who do not necessarily require or wish to pay for high-end database systems, may prefer to manage their data sets using the familiar spreadsheet-like interfaces supported by a sheets-based data management service. Using functionality of the kinds discussed above, associated with automatically-generated hierarchies of sheets and immutable references, a rich variety of scalable data management applications may be authored and deployed in various embodiments. The total amount of computation, memory and/or storage resources, as well as time and effort, expended to author, test, and deploy applications that are unaffected by structural changes to the underlying data sheets, may be reduced substantially by using the index sheets as intermediaries.

Illustrative Computer System

Figure 13:
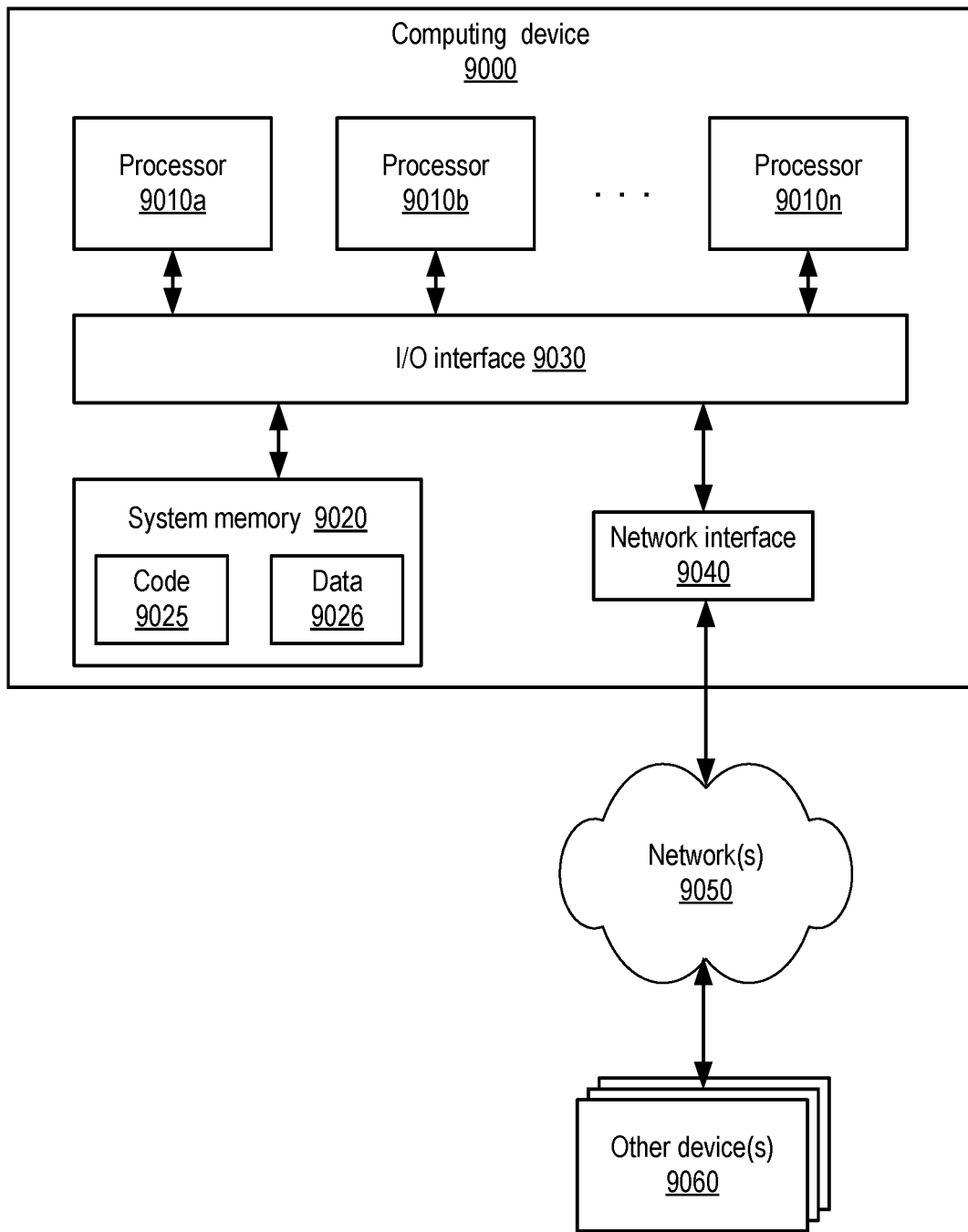
FIG. 13 is a block diagram illustrating an example computing device that may be used in at least some embodiments.

In at least some embodiments, a server that implements a portion or all of one or more of the technologies described herein, including the techniques for creating, populating, modifying and/or displaying contents of index and data sheets of a data management service may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices, comprising one or more processors and associated memory, of a network-accessible data management service;
   wherein the one or more computing devices include instructions that upon execution on the one or more processors cause the one or more computing devices to:
      obtain, via a programmatic interface, an indication that at least a portion of contents of a first data sheet is to be referenced or accessed by a plurality of applications, comprising a first and second application, to perform a plurality of computations, wherein the first data sheet comprises a first grid of cells;
      generate and store first and second independently-modifiable versions of a first index sheet, wherein the first index sheet comprises a second grid of cells, and wherein a proxy cell of the first and second independently-modifiable versions of the first index sheet comprises a first reference to a first content element of a first cell of the first data sheet;
      modify one or more cells of the first independently-modifiable version of the first index sheet, without causing a corresponding modification of the second independently-modifiable version of the first index sheet;
      generate and store a second index sheet, wherein the second index sheet comprises a third grid of cells, and wherein a proxy cell of the second index sheet comprises a second reference to a second content element of a second cell of the first data sheet;
      store metadata regarding a mapping between the proxy cell of the first and second independently-modifiable versions of the first index sheet with the first content element of the first data sheet, and regarding a mapping between the proxy cell of the second index sheet with the second content element of the first data sheet;
      automatically update, in response to a grid structure modification of the first data sheet which results in a change to a grid location of the first and second content elements, and based at least in part on the stored metadata, the first and second references of the proxy cells of the first and second index sheets, such that the first content element of the first data sheet continues to be referenced from the updated proxy cell of the first and second independently-modifiable versions of the first index sheet, and the second content element of the first data sheet continues to be referenced from the updated proxy cell of the second index sheet;
      access, from the first application, using the first reference of the updated proxy cell of the first index sheet, the first content element of the first data sheet to perform a first computation;
      determine a result of the first computation of the first application, based at least in part on the accessed first content element of the first data sheet;
      access, from the second application, using the second reference of the updated proxy cell of the second index sheet, the second content element of the first data sheet to perform a second computation;
      determine a result of the second computation of the second application, based at least in part on the accessed second content element of the first data sheet; and
      provide the result of the first computation to one or more destinations, and provide the result of the second computation to one or more same or different destinations.

2. The system as recited in claim 1, wherein the instructions upon execution on the processor cause the one or more computing devices to:
   in response to a request from an entity, received via a programmatic interface, to modify the first data sheet, wherein the entity is granted permission to modify at least a portion of the first index sheet, reject the request to modify the first data sheet.

3. The system as recited in claim 1, wherein the instructions upon execution on the processor cause the one or more computing devices to:
   in response to determining that a first modification request directed to the first index sheet would result in a change of a grid location of the proxy cell of the first index sheet, reject the modification request.

4. The system as recited in claim 3, wherein the instructions upon execution on the processor cause the one or more computing devices to:
   in response to determining that a second modification request directed to the first index sheet would not result in a change of a grid location of the proxy cell of the first index sheet, accept the modification request.

5. The system as recited in claim 1, wherein the instructions upon execution on the processor cause the one or more computing devices to:

cause the first independently-modifiable version of the first index sheet to be stored at a first platform;
cause the second independently-modifiable version of the first index sheet to be stored at a second platform;
wherein the modification of the one or more cells of the first independently-modifiable version of the first index sheet, without causing the corresponding modification of the second independently-modifiable version of the first index sheet, is performed in response to input received via a programmatic interface.

6. The system as recited in claim 5, wherein the first platform comprises one or more of: (a) a client-side deployment platform of the application, (b) an edge device of a provider network, or (c) a server at a data center at which at least a portion of network-accessible data management service is implemented.

7. The system as recited in claim 5, wherein the instructions upon execution on the processor cause the one or more computing devices to:
perform, by a branched version of the application, one or more computations using the one or more modified cells of the first independently-modifiable version; and
provide a result of the one or more computations.

8. A method, comprising:
performing, by one or more computing devices comprising one or more processors and associated memory:
storing a first and second index sheet corresponding to a first data sheet, wherein the first index sheet comprises a first and second independently-modifiable version of the first index sheet, wherein at least a portion of contents of a first data sheet is to be referenced or accessed by a plurality of applications, comprising a first and second application, to perform a plurality of computations, wherein the first data sheet comprises a first grid of cells, wherein the first index sheet comprises a second grid of cells, wherein the second index sheet comprises a third grid of cells, wherein a proxy cell of the first and second independently-modifiable versions of the first index sheet comprises a first reference to a first content element of a first cell of the first data sheet, and wherein a proxy cell of the second index sheet comprises a second reference to a second content element of a second cell of the first data sheet;
modify one or more cells of the first independently-modifiable version of the first index sheet, without causing a corresponding modification of the second independently-modifiable version of the first index sheet;
store metadata regarding a mapping between the proxy cell of the first and second independently-modifiable versions of the first index sheet with the first content element of the first data sheet, and regarding a mapping between the proxy cell of the second index sheet with the second content element of the first data sheet;
automatically updating, in response to a grid structure modification of the first data sheet which results in a change to a grid location of the first and second content elements, and based at least in part on the stored metadata, the first and second references of the proxy cells of the first and second index sheets such that the first content element of the first data sheet continues to be referenced from the updated proxy cell of the first and second independently-modifiable versions of the first index sheet, and the second content element of the first data sheet continues to be referenced from the updated proxy cell of the second index sheet;
obtaining, using the first reference of the updated proxy cell of the first index sheet, the first content element of the first data sheet to perform a first computation of the first application;
determining a result of the first computation of the first application, based at least in part on the obtained first content element of the first data sheet;
obtaining, using the second reference of the updated proxy cell of the second index sheet, the second content element of the first data sheet to perform a second computation of the second application;
determining a result of the second computation of the second application, based at least in part on the obtained second content element of the first data sheet; and
providing the result of the first computation of the first application, and the second computation of the second application, to one or more destinations.

9. The method as recited in claim 8, further comprising performing, by the one or more computing devices:
in response to detecting a modification directed to the first index sheet which results in a change of a grid location of the proxy cell of the first index sheet, automatically modifying the application to incorporate the change of the grid location.

10. The method as recited in claim 8, further comprising performing, by the one or more computing devices:
generating the first index sheet in response to a request received via a programmatic interface, wherein the request indicates one or more cells of the first data sheet for which references are to be included in the first index sheet.

11. The method as recited in claim 10, wherein the request is received at a network-accessible data management service of a provider network.

12. The method as recited in claim 10, further comprising performing, by the one or more computing devices:
identifying the one or more cells for which references are to be included in the first index sheet, based at least on part on detecting a portion of a display of the first data sheet that has been selected by a user via an interactive interface.

13. The method as recited in claim 8, wherein the proxy cell of the second index sheet comprises an expression which references the one or more cells of the first data sheet, including the first cell of the first data sheet.

14. The method as recited in claim 6, further comprising performing, by the one or more computing devices:
including, in a first set of cells of the first index sheet to be used to reference contents of a second set of entries of the spreadsheet table, one or more cell range indicators, such that the number of cells in the first set is smaller than the number of cells of the second set.

15. The method as recited in claim 6, wherein determining the result of the first computation comprises obtaining, using an identifier of another cell of the first index sheet, a value of an expression stored in the other cell, wherein the expression does not refer to the first data sheet.

16. A non-transitory computer-accessible storage medium storing program instructions that when executed on one or more processors cause the one or more processors to:
store a first and a second index structure corresponding to a first data sheet, wherein the first index structure comprises a first and second independently-modifiable version of the first index structure, wherein at least a portion of contents of a first data sheet is to be referenced or accessed by a plurality of applications, comprising a first and second application, to perform a plurality of computations, wherein the first data sheet comprises a first grid of cells, wherein the first and second index structures comprise a respective first and second plurality of index entries, wherein a proxy index entry of the first and second independently-modifiable versions of the first index structure comprises a first reference to a first content element of a first cell of the first data sheet, and wherein a proxy index entry of the second index structure comprises a second reference to a second content element of a second cell of the first data sheet;

modify one or more cells of the first independently-modifiable version of the first index structure, without causing a corresponding modification of the second independently-modifiable version of the first index structure;

store metadata regarding a mapping between the proxy index entry of the first and second independently-modifiable versions of the first index structure with the first content element of the first data sheet, and regarding a mapping between the proxy index entry of the second index structure with the second content element of the first data sheet;

automatically update, in response to a grid structure modification of the first data sheet which results in a change to a grid location of the first and second content elements, and based at least in part on the stored metadata, the first reference of the proxy index entry of the first index structure and the second reference of the proxy index entry of the second index structure, such that the first content element of the first data sheet continues to be referenced from the updated proxy index entry of the first and second independently-modifiable versions of the first index structure, and the second content element of the first data sheet continues to be referenced from the updated proxy index entry of the second index structure;

obtain, using the first reference of the proxy index entry of the first index structure, the first content element of the first data sheet to perform a first computation of the first application;

determine a result of the first computation of the first application, based at least in part on the obtained first content element of the first data sheet;

obtain, using the second reference of the proxy index entry of the second index structure, the second content element of the first data sheet to perform a second computation of the second application;

determine a result of the second computation of the second application, based at least in part on the obtained second content element of the first data sheet; and providing the result of the first computation of the first application, and the second computation of the second application, to one or more destinations.

17. The non-transitory computer-accessible storage medium as recited in claim 16, wherein the instructions when executed on one or more processors cause the one or more processors to:

in response to determining that a modification request directed to the first index structure would result in a change of a location of the first index entry of the first index structure, reject the modification request.

18. The non-transitory computer-accessible storage medium as recited in claim 16, wherein the first index structure comprises a second grid of cells, wherein the first index entry comprises a proxy cell of the second grid of cells.

19. The non-transitory computer-accessible storage medium as recited in claim 16, instructions when executed on one or more processors cause the one or more processors to:

generate a third index structure as a child sheet associated with a particular parent cell of the first data sheet, wherein the child sheet comprises a second grid of cells, wherein in response to a change applied to another cell of the first data sheet, contents of one or more cells of the second grid are updated in accordance with a child sheet template associated with the first data sheet.

20. The non-transitory computer-accessible storage medium as recited in claim 16, wherein the instructions when executed on one or more processors cause the one or more processors to:

generating the first index structure in response to a request received via a programmatic interface, wherein the request indicates one or more cells of the first data sheet for which references are to be included in the first index structure.

* * * * *